United States Patent
Finn

(10) Patent No.: US 11,347,993 B2
(45) Date of Patent: May 31, 2022

(54) DUAL INTERFACE METAL CARDS AND METHODS OF MANUFACTURING

(71) Applicant: Federal Card Services, LLC, Cincinnati, OH (US)

(72) Inventor: David Finn, Füssen Weissensee (DE)

(73) Assignee: Federal Card Services, LLC, Cincinnati, OH (US)

( * ) Notice: Subject to any disclaimer, the term of this patent is extended or adjusted under 35 U.S.C. 154(b) by 0 days.

(21) Appl. No.: 16/991,136

(22) Filed: Aug. 12, 2020

(65) Prior Publication Data
US 2021/0073608 A1    Mar. 11, 2021

Related U.S. Application Data

(60) Provisional application No. 63/053,559, filed on Jul. 17, 2020, provisional application No. 63/040,544, (Continued)

(51) Int. Cl.
*G06K 19/077* (2006.01)
*B21D 5/16* (2006.01)

(52) U.S. Cl.
CPC ......... *G06K 19/07773* (2013.01); *B21D 5/16* (2013.01); *G06K 19/07716* (2013.01); (Continued)

(58) Field of Classification Search
CPC ....... G06K 19/07773; G06K 19/07716; G06K 19/07722; G06K 19/07749; G06K 19/07728; B21D 5/16; B26F 1/00
See application file for complete search history.

(56) References Cited

U.S. PATENT DOCUMENTS

| 5,413,814 A | 5/1995 | Bowen et al. |
| 6,019,268 A | 2/2000 | Melzer et al. |

(Continued)

FOREIGN PATENT DOCUMENTS

| CN | 205158409 U | 4/2016 |
| EP | 2372840 | 9/2013 |

(Continued)

OTHER PUBLICATIONS

International Search Report and Written Opinion for PCT/US20/45840, dated Jan. 12, 2021.

(Continued)

*Primary Examiner* — Matthew Mikels
(74) *Attorney, Agent, or Firm* — Michael D. Eisenberg

(57) ABSTRACT

(i) Smartcards (SC) manufactured from a web of metal inlays (MI; FIGS. 12-14) with the coupling frame (CF) forming the metal card body (MCB) supported by metal struts (struts). In the production of smartcards having a coupling frame (CF) with a slit (S), the slit may form part of graphic elements (FIGS. 10-12). (ii) Printing and coating techniques may be used to camouflage the slit (FIGS. 9A-9D). (iii) Surface currents may be collected from one location in a card body (CB) and transported to another location (FIGS. 15AB). A flexible circuit (FC) may be connected to termination points (TP) across the slit (S), or may couple via a patch antenna (PA) with the slit (S). The flexible circuit may couple, via an antenna structure (AS) with the module antenna (MA) of a transponder chip module (TCM).

12 Claims, 20 Drawing Sheets

Related U.S. Application Data filed on Jun. 18, 2020, provisional application No. 63/040,033, filed on Jun. 17, 2020, provisional application No. 63/035,670, filed on Jun. 5, 2020, provisional application No. 63/034,965, filed on Jun. 4, 2020, provisional application No. 63/031,571, filed on May 29, 2020, provisional application No. 63/014,142, filed on Apr. 23, 2020, provisional application No. 62/986,612, filed on Mar. 6, 2020, provisional application No. 62/981,040, filed on Feb. 25, 2020, provisional application No. 62/979,422, filed on Feb. 21, 2020, provisional application No. 62/978,826, filed on Feb. 20, 2020, provisional application No. 62/971,927, filed on Feb. 8, 2020, provisional application No. 62/969,034, filed on Feb. 1, 2020, provisional application No. 62/960,178, filed on Jan. 13, 2020, provisional application No. 62/936,519, filed on Nov. 17, 2019, provisional application No. 62/912,701, filed on Oct. 9, 2019, provisional application No. 62/894,976, filed on Sep. 3, 2019, provisional application No. 62/891,433, filed on Aug. 26, 2019, provisional application No. 62/891,308, filed on Aug. 24, 2019, provisional application No. 62/889,555, filed on Aug. 20, 2019, provisional application No. 62/889,055, filed on Aug. 20, 2019, provisional application No. 62/888,539, filed on Aug. 18, 2019, provisional application No. 62/887,696, filed on Aug. 16, 2019, provisional application No. 62/886,978, filed on Aug. 15, 2019, provisional application No. 62/886,370, filed on Aug. 14, 2019, provisional application No. 62/885,327, filed on Aug. 12, 2019.

(52) U.S. Cl.
CPC . *G06K 19/07722* (2013.01); *G06K 19/07728* (2013.01); *G06K 19/07749* (2013.01)

(56) References Cited

U.S. PATENT DOCUMENTS

| | | | |
|---|---|---|---|
| 6,139,664 A | 10/2000 | Melzer et al. |
| D436,620 S | 1/2001 | Webb et al. |
| D438,562 S | 3/2001 | Webb et al. |
| D438,563 S | 3/2001 | Webb et al. |
| 6,214,155 B1 | 4/2001 | Leighton |
| D442,222 S | 5/2001 | Webb et al. |
| D442,627 S | 5/2001 | Webb et al. |
| D442,628 S | 5/2001 | Webb et al. |
| D442,629 S | 5/2001 | Webb et al. |
| D443,298 S | 6/2001 | Webb et al. |
| D447,515 S | 9/2001 | Faenza, Jr. et al. |
| D449,336 S | 10/2001 | Webb et al. |
| 6,378,774 B1 | 4/2002 | Emori et al. |
| 6,452,563 B1 | 9/2002 | Porte |
| 6,491,229 B1 | 12/2002 | Berney |
| 6,581,839 B1 | 6/2003 | Lasch et al. |
| 6,656,541 B1 | 12/2003 | Archer et al. |
| 6,669,813 B1 | 12/2003 | Melzer et al. |
| 6,749,123 B2 | 6/2004 | Lasch et al. |
| 6,764,014 B2 | 7/2004 | Lasch et al. |
| 6,843,422 B2 | 1/2005 | Jones et al. |
| D507,298 S | 7/2005 | Allard et al. |
| D507,598 S | 7/2005 | Allard et al. |
| D508,261 S | 8/2005 | Allard et al. |
| D510,103 S | 9/2005 | Allard et al. |
| D512,095 S | 11/2005 | Allard et al. |
| D523,471 S | 6/2006 | Allard et al. |
| D525,298 S | 7/2006 | Allard et al. |
| D525,653 S | 7/2006 | Allard et al. |
| D525,654 S | 7/2006 | Allard et al. |
| D526,013 S | 8/2006 | Allard et al. |
| D526,014 S | 8/2006 | Allard et al. |
| D526,015 S | 8/2006 | Allard et al. |
| D526,016 S | 8/2006 | Allard et al. |
| D527,421 S | 8/2006 | Allard et al. |
| D529,955 S | 10/2006 | Allard et al. |
| 7,207,494 B2 | 4/2007 | Theodossiou et al. |
| 7,278,580 B2 | 10/2007 | Jones et al. |
| 7,287,704 B2 | 10/2007 | Herslow |
| 7,306,158 B2 | 12/2007 | Berardi et al. |
| 7,306,163 B2 | 12/2007 | Scholz et al. |
| D569,423 S | 5/2008 | Lasch et al. |
| 7,377,443 B2 | 5/2008 | Lasch et al. |
| 7,381,355 B2 | 6/2008 | Rawlins et al. |
| D572,305 S | 7/2008 | Lasch et al. |
| D578,569 S | 10/2008 | Lasch et al. |
| D579,044 S | 10/2008 | Lasch et al. |
| 7,494,057 B2 | 2/2009 | Lasch et al. |
| 7,530,491 B2 | 5/2009 | Lasch et al. |
| D593,600 S | 6/2009 | Lasch et al. |
| 7,544,266 B2 | 6/2009 | Herring et al. |
| 7,607,583 B2 | 10/2009 | Berardi et al. |
| 7,819,310 B2 | 10/2010 | Lasch et al. |
| 7,823,777 B2 | 11/2010 | Varga et al. |
| 7,837,116 B2 | 11/2010 | Morrill Webb et al. |
| 7,971,786 B2 | 7/2011 | Lasch et al. |
| 8,033,457 B2 | 10/2011 | Varga et al. |
| 8,066,190 B2 | 11/2011 | Faenza, Jr. |
| 8,079,514 B2 | 12/2011 | Lasch et al. |
| 8,100,337 B2 | 1/2012 | Artigue et al. |
| 8,186,582 B2 | 5/2012 | Varga et al. |
| 8,186,598 B2 | 5/2012 | Faenza, Jr. |
| 8,393,547 B2 | 3/2013 | Kiekhaefer et al. |
| 8,448,872 B2 | 5/2013 | Droz |
| 8,490,872 B2 | 7/2013 | Kim |
| 8,523,062 B2 | 9/2013 | Varga et al. |
| 8,608,082 B2 | 12/2013 | Le Garrec et al. |
| 8,672,232 B2 | 3/2014 | Herslow |
| 8,702,328 B2 | 4/2014 | Cronin et al. |
| 8,737,915 B2 | 5/2014 | Beenken |
| 8,777,116 B2 | 6/2014 | Lin |
| 8,931,691 B2 | 1/2015 | Manessis et al. |
| 8,976,075 B2 | 3/2015 | Kato et al. |
| 9,024,763 B2 | 5/2015 | Hamedani |
| 9,033,250 B2 | 5/2015 | Finn et al. |
| 9,203,157 B2 | 12/2015 | Kato et al. |
| 9,269,032 B2 | 2/2016 | Zlotnik et al. |
| 9,272,370 B2 | 3/2016 | Finn et al. |
| 9,299,020 B2 | 3/2016 | Zimmerman et al. |
| D756,317 S | 5/2016 | Finn et al. |
| 9,390,360 B1 | 7/2016 | Yang et al. |
| 9,390,363 B1 | 7/2016 | Herslow et al. |
| 9,390,364 B2 | 7/2016 | Finn et al. |
| 9,390,366 B1 | 7/2016 | Herslow |
| 9,475,086 B2 | 10/2016 | Finn et al. |
| 9,489,613 B2 | 11/2016 | Finn et al. |
| 9,542,635 B2 | 1/2017 | Herslow |
| 9,564,678 B2 | 2/2017 | Kato et al. |
| 9,622,359 B2 | 4/2017 | Finn et al. |
| 9,634,391 B2 | 4/2017 | Finn et al. |
| 9,697,459 B2 | 7/2017 | Finn et al. |
| 9,721,200 B2 | 8/2017 | Herslow |
| 9,727,759 B2 | 8/2017 | Essebag et al. |
| 9,760,816 B1 | 9/2017 | Williams et al. |
| 9,798,968 B2 | 10/2017 | Finn et al. |
| 9,812,782 B2 | 11/2017 | Finn et al. |
| 9,836,684 B2 | 12/2017 | Finn et al. |
| 9,836,687 B1 | 12/2017 | Williams et al. |
| 9,892,405 B2 | 2/2018 | Olson et al. |
| 9,898,699 B2 | 2/2018 | Herslow et al. |
| 9,960,476 B2 | 5/2018 | Finn et al. |
| 10,032,169 B2 | 7/2018 | Essebag et al. |
| 10,089,570 B2 | 10/2018 | Herslow et al. |
| 10,140,569 B2 | 11/2018 | Kim et al. |
| 10,160,247 B2 | 12/2018 | Beech |
| 10,193,211 B2 | 1/2019 | Finn et al. |
| 10,248,902 B1 | 4/2019 | Finn et al. |
| 10,262,258 B2 | 4/2019 | Beech et al. |
| 10,275,703 B2 | 4/2019 | Herslow et al. |
| 10,289,944 B2 | 5/2019 | Herslow et al. |

(56) References Cited

U.S. PATENT DOCUMENTS

| | | | |
|---|---|---|---|
| 10,311,346 B2 | 6/2019 | Herslow | |
| 10,318,859 B2 | 6/2019 | Lowe et al. | |
| 10,325,135 B2 | 6/2019 | Andersen et al. | |
| 10,332,846 B2 | 6/2019 | Herslow | |
| 10,373,920 B2 | 8/2019 | Herslow | |
| 10,395,153 B2 | 8/2019 | Herslow | |
| 10,395,164 B2 | 8/2019 | Lundberg et al. | |
| 10,406,734 B2 | 9/2019 | Lowe | |
| 10,445,636 B2 | 10/2019 | Virostek et al. | |
| 10,507,677 B2 | 12/2019 | Wooldridge et al. | |
| 10,518,518 B2 | 12/2019 | Finn et al. | |
| 10,534,990 B2 | 1/2020 | Herslow et al. | |
| 10,583,594 B2 | 3/2020 | Lowe | |
| 10,583,683 B1 | 3/2020 | Ridenour et al. | |
| 10,599,972 B2 | 3/2020 | Finn et al. | |
| 10,552,722 B2 | 10/2020 | Finn et al. | |
| 2004/0099746 A1 | 5/2004 | Norton | |
| 2005/0003297 A1 | 1/2005 | Labrec | |
| 2005/0040243 A1 | 2/2005 | Daoshen et al. | |
| 2005/0095408 A1 | 5/2005 | Labrec et al. | |
| 2008/0106412 A1* | 5/2008 | Sakama | H01Q 9/0414 340/572.1 |
| 2011/0181486 A1 | 7/2011 | Kato | |
| 2012/0112971 A1 | 5/2012 | Takeyama et al. | |
| 2013/0126622 A1 | 5/2013 | Finn | |
| 2014/0091149 A1 | 4/2014 | Finn et al. | |
| 2014/0231503 A1 | 8/2014 | Kunitaka | |
| 2014/0279555 A1 | 9/2014 | Guillaud | |
| 2014/0284386 A1 | 9/2014 | Finn et al. | |
| 2015/0021403 A1 | 1/2015 | Finn et al. | |
| 2015/0129665 A1 | 5/2015 | Finn et al. | |
| 2015/0206047 A1 | 7/2015 | Herslow et al. | |
| 2015/0269477 A1 | 9/2015 | Finn et al. | |
| 2016/0110639 A1 | 4/2016 | Finn et al. | |
| 2016/0148194 A1 | 5/2016 | Guillaud et al. | |
| 2016/0257019 A1 | 9/2016 | Melzer et al. | |
| 2017/0267103 A1 | 9/2017 | Nomura | |
| 2018/0005064 A1 | 1/2018 | Vogel et al. | |
| 2018/0341846 A1 | 3/2018 | Finn et al. | |
| 2018/0339503 A1 | 11/2018 | Finn et al. | |
| 2018/0341847 A1 | 11/2018 | Finn et al. | |
| 2018/0349751 A1 | 12/2018 | Herslow et al. | |
| 2019/0050706 A1 | 2/2019 | Lowe | |
| 2019/0073578 A1 | 3/2019 | Lowe et al. | |
| 2019/0102662 A1 | 4/2019 | Snell et al. | |
| 2019/0114526 A1 | 4/2019 | Finn et al. | |
| 2019/0156994 A1 | 5/2019 | Cox | |
| 2019/0160717 A1 | 5/2019 | Lowe | |
| 2019/0171923 A1* | 6/2019 | Finn | B32B 7/12 |
| 2019/0197386 A1 | 6/2019 | Finn et al. | |
| 2019/0236434 A1 | 8/2019 | Lowe | |
| 2019/0251322 A1 | 8/2019 | Slogedal et al. | |
| 2019/0251411 A1 | 8/2019 | Gire et al. | |
| 2019/0286961 A1 | 9/2019 | Lowe | |
| 2019/0291316 A1 | 9/2019 | Lowe | |
| 2019/0311235 A1 | 10/2019 | Sexl et al. | |
| 2019/0311236 A1 | 10/2019 | Sexl et al. | |
| 2019/0332907 A1 | 10/2019 | Herslow | |
| 2019/0384261 A1 | 12/2019 | Nam et al. | |
| 2020/0034578 A1 | 1/2020 | Finn et al. | |
| 2020/0151534 A1 | 5/2020 | Lotya et al. | |
| 2020/0164675 A1 | 5/2020 | Ridenour et al. | |

FOREIGN PATENT DOCUMENTS

| | | |
|---|---|---|
| KR | 10-1754985 | 6/2017 |
| WO | WO 2017/090891 | 6/2017 |
| WO | WO 2017/198842 | 11/2017 |
| WO | WO 2018/202774 | 11/2018 |
| WO | WO 2019/173455 | 9/2019 |

OTHER PUBLICATIONS

A Metallic RFID Tag Design for Steel-Bar and Wire-Rod Management Application in the Steel Industry, Chen, S.L., Kuo, S.K. and Lin C.T., Progress In Electromagnetics Research, PIER 91, pp. 195-212, 2009.
T900306, Cast Modified Epoxy Adhesive, GTS Flexible Materials, Feb. 13, 2019, 2pp.
DEVT-008-20, Epoxy Adhesive Pen Tapes, GTS Flexible Materials, Jan. 9, 2020, 2pp.

* cited by examiner (FIG. 3 of US 9,836,684)

(FIG. 2 of US 2018/0341847)

FC with CLS, connected to TP
and an AS coupling with MA

FC with CLS and a PA, overlying slit
(no direct connection to TPs)

DUAL INTERFACE METAL CARDS AND METHODS OF MANUFACTURING

CROSS-REFERENCES TO RELATED APPLICATIONS

Priority (filing date benefit) is claimed from the following, incorporated by reference herein:
 a nonprovisional of 63/053,559 filed 17 Jul. 2020
 a nonprovisional of 63/040,544 filed 18 Jun. 2020
 a nonprovisional of 63/040,033 filed 17 Jun. 2020
 a nonprovisional of 63/035,670 filed 5 Jun. 2020
 a nonprovisional of 63/034,965 filed 4 Jun. 2020
 a nonprovisional of 63/031,571 filed 29 May 2020
 a nonprovisional of 63/014,142 filed 23 Apr. 2020
 a nonprovisional of 62/986,612 filed 6 Mar. 2020
 a nonprovisional of 62/981,040 filed 25 Feb. 2020
 a nonprovisional of 62/979,422 filed 21 Feb. 2020
 a nonprovisional of 62/978,826 filed 20 Feb. 2020
 a nonprovisional of 62/971,927 filed 8 Feb. 2020
 a nonprovisional of 62/969,034 filed 1 Feb. 2020
 a nonprovisional of 62/960,178 filed 13 Jan. 2020
 a nonprovisional of 62/936,519 filed 17 Nov. 2019
 a nonprovisional of 62/912,701 filed 9 Oct. 2019
 a nonprovisional of 62/894,976 filed 3 Sep. 2019
 a nonprovisional of 62/891,433 filed 26 Aug. 2019
 a nonprovisional of 62/891,308 filed 24 Aug. 2019
 a nonprovisional of 62/889,555 filed 20 Aug. 2019
 a nonprovisional of 62/889,055 filed 20 Aug. 2019
 a nonprovisional of 62/888,539 filed 18 Aug. 2019
 a nonprovisional of 62/887,696 filed 16 Aug. 2019
 a nonprovisional of 62/886,978 filed 15 Aug. 2019
 a nonprovisional of 62/886,370 filed 14 Aug. 2019
 a nonprovisional of 62/885,327 filed 12 Aug. 2019

TECHNICAL FIELD

This disclosure relates to RFID-enabled (or "contactless" capable) smartcards ("cards"), such as metal transaction cards and, more particularly, to metal cards using slit technology to facilitate contactless communication and taking measures to fill, seal and disguise the presence of the slit in the metal card body.

The disclosure may relate broadly to passive RFID-enabled metal transaction cards including "metal smartcards" such as encapsulated metal smartcards (aka encased metal cards), metal core smartcards (aka embedded metal or metal veneer smartcards—plastic front, edge to edge metal core, plastic back), metal face smartcards (aka metal hybrid cards—metal front, plastic back), full metal smartcards, and biometric metal smartcards, having an RFID chip (IC) capable of operating in a "contactless" mode (ISO 14443 or NFC/ISO 15693), including dual interface (DI) metal smartcards and metal payment objects (or "metal payment devices") which can also operate in "contact" mode (ISO 7816-2). Some of the disclosure(s) herein may relate to metal smartcards having only a contactless interface.

The disclosure(s) herein may further relate to biometric transaction cards and smartcards with a dynamic display.

Some of the disclosure(s) herein may relate to RFID-enabled metal transaction cards having only a contact interface, or having only a contactless interface, or having dual interface (DI; contact and contactless).

BACKGROUND

Passive dual interface smartcards with a metal layer (ML) or metal card body (MCB) having a slit (S) and a module opening (MO) to accommodate a transponder chip module (TCM) or an inductive coupling chip module (ICM) (6 or 8 pin package) is known in the smartcard industry. The metal layer (ML) or metal card body (MCB) with a slit (S) extending from a perimeter edge to a module opening (MO), so as to function as a coupling frame (CF), requires that the module antenna (MA) of the transponder chip module (TCM) overlaps at least a portion of the metal within the area of the module opening (MO). In other words, the turns or windings of the module antenna (MA) on the face-down side or rear side of the transponder chip module (having contact pads on the face-up side) must overlap at very close range the metal layer in the module opening (MO) to enable contactless communication when the smartcard is in an electromagnetic field generated by a reader or point of sale terminal.

The transponder chip module (TCM) comprises a module antenna (MA) with a certain number of turns or windings electrically connected on the module tape (MT) to the antenna bonding pads $L_A$ and $L_B$ of the RFID chip (IC). In a wearable payment device made of metal, according to the prior art, the transponder chip module does not have contact pads, and the module antenna overlaps the slit or discontinuity which begins at a perimeter edge of the metal and extends across the metal housing forming an integral part of the wearable device.

The integration of a booster antenna (BA), compensating loop (CL), discontinuous metal frame (DMF) and coupling frame (CF) in smartcards to amplify the RF signal for inductive coupling with the module antenna (MA) of a transponder chip module (TCM), as well as the alternative approach of physically connecting an in-card antenna to the connection pads on a chip module without a module antenna is well documented, and sets the stage for the next generation of contact and contactless transaction cards with multiple components and sensors.

The prior art is silent on a metal layer (ML) or metal card body (MCB) without a slit (S) acting as a coupling frame (CF), to drive a transponder chip module (TCM). In all representations of the RFID slit technology in smartcards, the transponder chip module comprises an RFID chip connected to a module antenna on the same substrate. In all disclosures of dual interface smartcards, the slit always extends from a perimeter edge to a module opening (MO), without considering that the slit may not need to extend to the module opening (MO) in order to operate as a coupling frame. Distribution of surface currents from different locations on a metal card body is not acknowledged by the prior art, and that such locations could individually drive an electronic component or several components.

The prior art does not disclose the application of a flexible circuit (FC) to pick-up surface current from a discontinuity in a metal card body and to direct such current to an antenna structure, discrete component or any electronic device.

The prior art is also silent on measures to disguise or camouflage a discontinuity in a metal card body and how the discontinuity can become part of the artwork or graphic elements in the design of a metal transaction card.

However, US 20190236434 discloses that the slit may not be visible. For example:
 The discontinuity as described herein may be optically visible from one or both surfaces of the card. In some embodiments, such as one in which the back surface is covered with an opaque plastic or translucent plastic with opaque ink, the discontinuity may not be visible from the back surface. In embodiments with front decorative layers, such as wood, leather, or certain ceramics, the discontinuity may also be hidden from the front.

Also, US 20150021403 also describes filling and disguising the slit at FIG. 5B [0236, 0246, 0259], and reinforcing the slit at FIG. 8 [0260-0264, 0267-0268].

Some Definitions

Some of the following terms may be used or referred to, herein.

Eddy Currents

Eddy currents are induced electrical currents that flow in a circular path. In other words, they are closed loops of induced current circulating in planes perpendicular to the magnetic flux. Eddy currents concentrate near the surface adjacent to the excitation coil of the contactless reader generating the electromagnetic field, and their strength decreases with distance from the transmitter coil. Eddy current density decreases exponentially with depth. This phenomenon is known as the skin effect. The depth that eddy currents penetrate into a metal object is affected by the frequency of the excitation current and the electrical conductivity and magnetic permeability of the metal.

Skin Depth

Skin effect is the tendency of an alternating electric current (AC) to become distributed within a conductor such that the current density is largest near the surface of the conductor, and decreases with greater depths in the conductor. The electric current flows mainly at the "skin" of the conductor, between the outer surface and a level called the skin depth. The skin effect causes the effective resistance of the conductor to increase at higher frequencies where the skin depth is smaller, thus reducing the effective cross-section of the conductor. The skin effect is due to opposing eddy currents induced by the changing magnetic field resulting from the alternating current.

Eddy Currents and a Slit in a Metal Layer or Metal Card Body

A discontinuity interrupts or alters the amplitude and pattern of the eddy currents which result from the induced electromagnetic field generated by a contactless point of sale terminal. The eddy current density is highest near the surface of the metal layer (ML) and decreases exponentially with depth.

RFID Slit Technology

Providing a metal layer in a stackup of a card body, or an entire metal card body, to have a module opening for receiving a transponder chip module (TCM) and a slit (S) to improve contactless (RF) interface with the card—in other words, a "coupling frame"—may be described in greater detail in U.S. Pat. Nos. 9,475,086, 9,798,968, and in some other patents that may be mentioned herein. In some cases, a coupling frame may be formed from a metal layer or metal card body having a slit, without having a module opening. A typical slit may have a width of approximately 100 µm. As may be used herein, a "micro-slit" refers to a slit having a smaller width, such as approximately 50 µm, or less.

"RFID Slit Technology" refers to modifying a metal layer (ML) or a metal card body (MCB) into a so-called "antenna circuit" by providing a discontinuity in the form of a slit, slot or gap in the metal layer (ML) or metal card body (MCB) which extends from a peripheral edge to an inner area or opening of the layer or card body. The concentration of surface current at the inner area or opening can be picked up by another antenna (such as a module antenna) or antenna circuit by means of inductive coupling which can drive an electronic circuit such as an RFID chip attached directly or indirectly thereto. The slit may be ultra-fine (typically less than 50 µm or less than 100 µm), cut entirely through the metal with a UV laser, with the debris from the plume removed by ultrasonic or plasma cleaning. Without a cleaning step after lasing, the contamination may lead to shorting across the slit. In addition, the slit may be filled with a dielectric to avoid such shorting during flexing of the metal forming the transaction card. The laser-cut slit may be further reinforced with the same filler such as a resin, epoxy, mold material, repair liquid or sealant applied and allowed to cure to a hardened state or flexible state. The filler may be dispensed or injection molded. The term "slit technology" may also refer to a "coupling frame" with the aforementioned slit, or to a smartcard embodying the slit technology or having a coupling frame incorporated therein.

Module Antenna (MA)

This is an antenna structure (AS) located on the face-down-side of a transponder chip module (TCM) or dual interface chip module (DI chip module) for inductive coupling with an in-card booster antenna (BA) or coupling frame (CF). The antenna structure (AS) is usually rectangular in shape with dimensions confined to the size of the module package having 6 or 8 contact pads on the face-up-side. The termination ends of the antenna structure (AS) with multiple windings (13 to 15 turns) based on a frequency of interest (e.g. 13.56 MHz) are bonded to the connection pads ($L_A$ and $L_B$) on the RFID chip. In the case of a coupling frame (CF) smartcard such as a dual interface metal core transaction card, the module antenna (MA) overlaps the coupling frame or metal layer(s) within the card body at the area of the module opening to accept the transponder chip module (TCM).

Coupling Loop Antenna (CLA)

This is antenna structure (AS) which couples to a module antenna (MA) in a transponder chip module (TCM). The windings or traces of the coupling loop antenna (CLA) may intertwine those windings of the module antenna (MA), or the windings or traces of the coupling loop antenna (CLA) may couple closely with the windings of the module antenna (MA) similar in function to a primary and secondary coil of a transformer. The termination ends of a coupling loop antenna (CLA) may be connected to termination points (TPs) across a discontinuity in a metal layer (ML) or metal card body (MCB) acting as a coupling frame (CF).

Coupling Frame Antenna (CFA)

A metal layer or metal card body with a discontinuity may be represented by card size planar antenna having a single turn, with the width of the antenna track significantly greater than the skin depth at the frequency of interest.

Sense Coil (SeC), Patch Antenna (PA) and Pick-Up Coil (PuC)

These are all types of coils or antennas used to capture surface current by means of inductive coupling at the edge of a metal layer (ML) or metal card body (MCB) or around a discontinuity in a metal layer (ML) or metal card body (MCB) when such conductive surfaces are exposed to an electromagnetic field. The coils or antennas may be wire wound, chemically etched or laser etched, and positioned at very close proximity to a discontinuity in a metal layer, at the interface between a conductive and non-conductive surface, or at the edge of a metal layer.

Antenna Cell (AC)

It is an antenna structure (AS) such as sense coil (SeC), patch antenna (PA) or pick-up coil (PuC) on a flexible circuit (FC) driving an electronic component such as a fingerprint sensor or a dynamic display. A plurality of antenna cells (ACs) at different locations in a metal transaction card may be used to power several electronic components.

Antenna Probe (AP)

A pick-up antenna in the form of a micro-metal strip (first electrode) may be placed in the middle of a discontinuity to probe eddy current signals from the magnetic flux interaction with the metal layer acting as the coupling frame. The metal layer also acts as the second electrode in the circuit. The metal strip may be replaced by a sense coil with a very fine antenna structure to pick-up the surface currents from within the discontinuity.

Booster Antenna

A booster antenna (BA) in a smartcard comprises a card antenna (CA) component with multiple turns or windings extending around the periphery edge of the card body (CB), a coupler coil (CC) component at a location for a module antenna (MA) of a transponder chip module (TCM), and an extension antenna (EA) component contributing to the inductance and tuning of the booster antenna (BA). A conventional booster antenna is a wire embedded antenna, ultrasonically scribed into a synthetic layer forming part of the stack-up construction of a dual interface smartcard. The card antenna (CA) on the periphery of the card body (CB) inductively couples with the contactless reader while the coupler coil (CC) inductively couples with the module antenna (MA) driving the RFID chip. US 20140091149 (2014-04-03; Finn, et al.) provides an example of a booster antenna (BA) for a smart card.

Coupling Loop Structure (CLS)

It is a flexible circuit (FC) with a sense Coil (SeC), patch antenna (PA) or pick-up coil (PuC) for inductive coupling with a discontinuity in a metal layer (coupling frame) to pick-up surface currents and to direct such currents via traces or tracks to an antenna having a frame or spiral shape on the flexible circuit (FC) which further inductively couples in close proximity with the module antenna (MA) of a transponder chip module (TCM).

Metal Edge & Metal Ledge

For optimum RF performance the dimensional width of the windings (or width across multiple windings) of a sense coil (SeC), patch antenna (PA) or a pick-up coil (PuC) ought to overlap a metal edge (ME) by 50% to capture the surface currents. The same applies to the module antenna (MA) of a transponder chip module (TCM) implanted in a metal containing transaction card. The dimensional width of the windings of the module antenna (MA) ought to overlap a metal ledge (P1) of a stepped cavity forming the module pocket in a card body by 50%. In the case of an antenna probe, surface currents are collected between very close metal edges. As the shape and form of the antennas may change, the dimensional width of the windings may be replaced by the surface area or volume.

Anodizing

It is an electrolytic passivation process used to increase the thickness of the natural oxide layer on the surface of metal parts. The process is called anodizing because the part to be treated forms the anode electrode of an electrolytic cell. Anodic films are most commonly applied to protect aluminum alloys, although processes also exist for titanium, zinc, magnesium, niobium, zirconium, hafnium, and tantalum.

Anodizing changes the microscopic texture of the surface and the crystal structure of the metal near the surface. Thick coatings are normally porous, so a sealing process is often needed to achieve corrosion resistance. Anodized aluminum surfaces, for example, are harder than aluminum but have low to moderate wear resistance that can be improved with increasing thickness or by applying suitable sealing substances. Anodic films are generally much stronger and more adherent than most types of paint and metal plating, but also more brittle. This makes them less likely to crack and peel from aging and wear, but more susceptible to cracking from thermal stress.

In using aluminum in the card stack-up construction of metal cards, techniques for anodizing packaging and decorative parts for the beauty and personal care industry are applied. The aluminum oxide layer has a thickness of 12 to 18 microns rendering the surface finish non-conductive. The weight of a solid aluminum smartcard is approximately 10.5 grams.

The coloring of the pristine aluminum is through anodizing (electrochemical treatment in a sulphuric acid bath with a continuous rack conveying system) and through dye-sublimation printing.

Double-anodizing involves passing the aluminum layer (e.g. 15 mils thick) through the electrochemical process first with one color, followed by a photo resist (for graphics—image embedding) and aluminum oxide growth in the repeat process to provide the second color or greater intensity of the first.

The type of alloy determines the prep formula used to color the aluminum. 5000 series aluminum achieves a high gloss finish. Aluminum 1000, 3000 and 7000 series may also be used. Aluminum alloy temper designations apply to the respective series.

Some Patents and Publications

The following patents and/or publications ("references") may be of interest or relevant to the invention(s) disclosed herein, and some commentary may be provided to distinguish the invention(s) disclosed herein from the following references.

U.S. Pat. No. 10,552,722 Smartcard with coupling frame antenna
U.S. Pat. No. 10,248,902 Coupling frames for RFID devices
U.S. Pat. No. 10,193,211 Smartcards, RFID devices, wearables and methods
U.S. Pat. No. 9,960,476 Smartcard constructions
U.S. Pat. No. 9,836,684 Smartcards, payment objects and methods
U.S. Pat. No. 9,812,782 Coupling frames for RFID devices
U.S. Pat. No. 9,798,968 Smartcard with coupling frame and method of increasing activation distance
U.S. Pat. No. 9,697,459 Passive smartcards, metal cards, payment objects
U.S. Pat. No. 9,634,391 RFID transponder chip modules
U.S. Pat. No. 9,622,359 RFID transponder chip modules
U.S. Pat. No. 9,489,613 RFID transponder chip modules with a band of the antenna extending inward
U.S. Pat. No. 9,475,086 Smartcard with coupling frame and method of increasing activation distance
U.S. Pat. No. 9,390,364 Transponder chip module with coupling frame on a common substrate
2020/0151534 Smartcards with metal layers and methods of manufacture
2020/0050914 Connection bridges for dual interface transponder chip modules
2020/0034578 Smartcard with display and energy harvesting
2020/0005114 Dual interface metal hybrid smartcard
2019/0392283 RFID transponder chip modules, elements thereof, and methods
2019/0197386 Contactless smartcards with multiple coupling frames 2019/0171923 Metallized smartcard constructions and methods
2019/0114526 Smartcard constructions and methods
2018/0341846 Contactless metal card construction
2018/0339503 Smartcards with metal layers and methods of manufacture

SOME ADDITIONAL (US) REFERENCES

U.S. Pat. No. 10,583,683 (10 Mar. 2020; Federal Card Services; Ridenour et al.)
U.S. Pat. No. 10,534,990 (14 Jan. 2020; CompoSecure; Herslow et al.)
U.S. Pat. No. 10,445,636 (15 Oct. 2019; Giesecke & Devrient; Virostek et al.)
U.S. Pat. No. 10,318,859 (11 Jun. 2019; CompoSecure; Lowe, et al.)
U.S. Pat. No. 10,289,944 (14 May 2019; CompoSecure; Herslow et al.)
U.S. Pat. No. 10,275,703 (30 Apr. 2019; CompoSecure; Herslow et al.)
U.S. Pat. No. 10,140,569 (27 Nov. 2018; Kim et al.)
U.S. Pat. No. 10,089,570 (2 Oct. 2018; CompoSecure; Herslow et al.)
U.S. Pat. No. 9,898,699 (20 Feb. 2018; CompoSecure; Herslow et al.)
U.S. Pat. No. 9,836,687 (2017-12-05; Williams et al.; AMEX)
U.S. Pat. No. 9,760,816 (12 Sep. 2017; American Express; Williams et al.)
U.S. Pat. No. 9,721,200 (1 Aug. 2017; CompoSecure; Herslow et al.)
U.S. Pat. No. 9,564,678 (7 Feb. 2017; Murata Manufacturing; Kato et al.)
U.S. Pat. No. 9,390,366 (12 Jul. 2016; CompoSecure; Herslow et al.)
U.S. Pat. No. 9,299,020 (29 Mar. 2016; TheCard; Zimmerman et al.)
U.S. Pat. No. 9,203,157 (2015-12-01; Kato et al.; Murata)
U.S. Pat. No. 9,024,763 (5 May 2015; Hamedani Soheil)
U.S. Pat. No. 8,976,075 (2015-03-10; Kato et al.; Murata)
U.S. Pat. No. 8,737,915 (27 May 2014; J. H. Tonnjes E.A.S.T.; Beenken)
U.S. Pat. No. 8,608,082 (17 Dec. 2013; La Garrec et al.; Oberthur Technologies, aka IDEMIA)
U.S. Pat. No. 8,523,062 (2013-09-03; Varga et al.)
U.S. Pat. No. 8,393,547 (12 Mar. 2013; Perfect Plastic Printing; Kiekhaefer et al.)
U.S. Pat. No. 8,186,582 (29 May 2012; American Express; Varga et al.)
U.S. Pat. No. 7,306,163 (11 Dec. 2007; IBM; Scholz et al.)
U.S. Pat. No. 6,491,229 (10 Dec. 2002; NJC Innovations; Berney)
U.S. Pat. No. 6,452,563 (17 Sep. 2002; Gemplus aka Gemalto; Porte)
2020/0164675 (2020-05-28; Ridenour et al.; FCS)
2019/0384261 (19 Dec. 2019; Kona I; Nam et al.)
2019/0311236 (2019-10-10; Sexi et al.; G&D)
2019/0311235 (2019-10-10; Sexi et al.; G&D)
2019/0291316 (2019-09-26; Lowe; CompoSecure; now 10,583,594)
2019/0286961 (2019-09-19; Lowe; CompoSecure)
2019/0236434 (1 Aug. 2019; CompoSecure; Lowe)
2019/0160717 (2019-05-30; Lowe; CompoSecure)
2019/0156994 (23 May 2019; X-Card Holdings; Cox)
2019/0073578 (7 Mar. 2019; CompoSecure; Lowe et al.)
2019/0050706 (14 Feb. 2019; Lowe; CompoSecure; now 10,406,734)
2015/0206047 (23 Jul. 2015; CompoSecure; Herslow)
2014/0231503 (21 Aug. 2014; Smart Co.; Kunitaka)
2013/0126622 (23 May 2013; Finn)
2012/0112971 (10 May 2012; Takeyama et al.; Panasonic)
2011/0181486 (28 Jul. 2011; Kato; Murata)
Chen, S. L., Kuo, S. K. and Lin C. T. (2009) incorporated by reference herein, discloses "A metallic RFID tag design for steel-bar and wire-rod management application in the steel industry" (Progress in Electromagnetics Research, PIER Vol. 91: pp. 195-212.)
EP 2372840 (25 Sep. 2013; Hashimoto; Panasonic)
CN 205158409U (13 Apr. 2016)
WO 2017/090891 (1 Jun. 2017; Biosmart; Yoon et al.)
KR 10-1754985 (30 Jun. 2017; Aichi CK Corporation aka ICK; Kim et al.)
PCT/US2019/020919 (12 Sep. 2019; X-Card Holding; Cox)

SUMMARY

The invention may relate to innovations in or improvements to RFID-enabled ("contactless capable) metal smartcards or metal transaction cards with/having Metal inlay to Metal Card Body and various stack up constructions.

It is an object of the invention(s), as may be disclosed in various embodiments presented herein, to provide improvements in the manufacturing, performance and/or appearance of smartcards (also known as transaction cards), such as metal transaction cards and, more particularly, to RFID-enabled smartcards (which may be referred to herein simply as "cards") having at least contactless capability, including dual interface (contactless and contact) smartcards, including cards having a metal layer in the stackup of their card body, and including cards having a card body which is substantially entirely formed of metal (i.e., a metal card body).

It is an object of the invention to produce metal core or metal face transaction cards having a discontinuity to function as a coupling frame, and using graphic elements incorporating the discontinuity to produce aesthetically pleasing smartcards that are mechanically robust and are not weaken in rigidity by the presence of the discontinuity in a metal layer forming part of the metal card body.

It is an object of the invention to collect surface currents from termination points on a metal card body acting as a coupling frame and redirecting the surface currents using a flexible circuit (FC) with antenna structures (AS) for the purpose of driving an electronic component such as a transponder chip module.

It is an object of the invention to integrate electronic components into the card body such as a fingerprint sensor, dynamic display, measurement sensor, switching element and camera.

It is an object of the invention to manufacture metal card bodies using machining techniques which reduce the production cycle time, while at the same time significantly increasing production capacity.

According to the invention(s), generally, some innovative techniques may be disclosed, as follows:
(i) Dual interface metal core smartcards can be manufactured from a continuous web of metal inlays with the coupling frame (CF) forming the metal card body (MCB) supported by metal struts. After lamination of synthetic layers to the front and rear sides of the metal inlay, the card bodies are easily machined around the area of the supporting struts, and the card body edges may be chamfered.

(ii) In the production of metal face smartcards with a visible discontinuity (e.g., slit), the discontinuity forms part of the graphic elements, and printing and coating techniques may be used to camouflage the discontinuity.

(iii) To collect surface currents from one location in a card body, a flexible circuit with antenna circuitry is hard wire connected to termination points across a discontinuity (e.g., slit) which may terminate at a module opening.

According to some embodiments (examples) of the invention, a smartcard (SC) may comprise: a first, front face metal layer (ML, 902) with a module opening (MO) and slit (S); a primer layer (904) disposed on a front surface of the front face metal layer; a first ink layer (908) disposed on the primer layer; a protective varnish layer (912); a dielectric layer (920) with adhesive disposed on a rear surface of the first metal layer; a second, supporting metal layer (ML, 922) with a module opening (MO) and slit (S) disposed below the dielectric layer; an adhesive layer (924) disposed below the second metal layer; a synthetic layer with artwork (926) disposed below the adhesive layer; and a laser-engravable overlay (928) with a magnetic stripe and a signature panel disposed below the synthetic layer. The smartcard may further comprise a personalization/laser engraving layer (914) disposed on the protective varnish layer, and a coating filling the slit.

After the primer layer is applied, a coating may be introduced to fill the slit. A concealing ink layer (906) may be disposed between the primer layer and the first ink layer. The first ink layer and concealing ink layer may be interchanged with one another, so that the first ink layer is disposed on the primer layer and the concealing ink layer is disposed on the first ink layer. A second ink layer (910) may be disposed on the first ink layer; and the protective varnish layer may be disposed on the second ink layer. The second ink layer and the protective varnish layer are interchanged with one another, so that the protective varnish layer is disposed on the first ink layer and the second ink layer is disposed on the protective varnish layer.

In some examples of smartcard constructions:

A smartcard (SC) may comprise: (FIG. 9B)
- a first, front face metal layer (ML, 902) with a module opening (MO) and slit (S);
- a primer layer (904) disposed on a front surface of the front face metal layer;
- a first ink layer (908) disposed on the primer layer;
- a protective varnish layer (912) disposed on the first ink layer;
- a second ink layer with raised alphanumeric characters (910) disposed on the varnish layer;
- a personalization/laser engraving layer (914) disposed on the second ink layer;
- a dielectric layer (920) with adhesive disposed on a rear surface of the first metal layer;
- a second, supporting metal layer (ML, 922) with a module opening (MO) and slit (S) disposed below the dielectric layer;
- an adhesive layer (924) disposed below the second metal layer;
- a synthetic layer with artwork (926) disposed below the adhesive layer;
- a laser-engravable overlay (928) with a magnetic stripe and a signature panel disposed below the synthetic layer.

After the primer layer is applied, a coating may be introduced to fill the slit.

A smartcard (SC) may comprise: (FIG. 9C)
- a first, front face metal layer (ML, 902) with a module opening (MO) and slit (S);
- a primer layer (904) disposed on a front surface of the front face metal layer;
- a first ink layer (908) disposed on the primer layer;
- a second ink layer with raised alphanumeric characters (910) disposed on the first ink layer;
- a protective varnish layer (912) disposed on the second ink layer;
- a personalization/laser engraving layer (914) disposed on the protective varnish layer;
- a dielectric layer (920) with adhesive disposed on a rear surface of the first metal layer;
- a second, supporting metal layer (ML, 922) with a module opening (MO) and slit (S) disposed below the dielectric layer;
- an adhesive layer (924) disposed below the second metal layer;
- a synthetic layer with artwork (926) disposed below the adhesive layer;
- a laser-engravable overlay (928) with a magnetic stripe and a signature panel disposed below the synthetic layer.

After the primer layer is applied, a coating may be introduced to fill the slit.

A smartcard (SC) may comprise: (FIG. 9D)
- a first, front face metal layer (ML, 902) with a module opening (MO) and slit (S);
- a primer layer (904) disposed on a front surface of the front face metal layer;
- a concealing ink layer (906) and a first ink layer (908) disposed on the primer layer;
- a second ink layer (910) with raised alphanumeric characters disposed on the concealing ink layer or the first ink layer;
- a protective varnish layer (912) disposed on the second ink layer;
- a personalization/laser engraving layer (914) disposed on the protective varnish layer;
- a dielectric layer (920) with adhesive disposed on a rear surface of the first metal layer;
- a second, supporting metal layer (ML, 922) with a module opening (MO) and slit (S) disposed below the dielectric layer;
- an adhesive layer (924) disposed below the second metal layer;
- a synthetic layer with artwork (926) disposed below the adhesive layer;
- a laser-engravable overlay (928) with a magnetic stripe and a signature panel disposed below the synthetic layer.

After the primer layer is applied, a coating may be introduced to fill the slit.

According to some embodiments (examples) of the invention, a smartcard (SC) may comprise: a metal layer (ML, 902) with a module opening (MO) and a slit (S); a primer layer (903) over the metal layer; a coating or sealant (907) over the primer layer; an ink layer (908) over the coating or sealant; and a laser engravable top coat layer (909) over the ink layer. The primer, coating or sealant, ink, and top coat layers may all be baked onto the metal layer. Each of the primer layer, coating or sealant, baked-on ink layer, and top coat layer may also have a module opening extending therethrough.

According to some embodiments (examples) of the invention, a method of making a metal inlay (MI) for a smartcard (SC) having two metal layers (ML1, ML2) may comprise: providing a single metal substrate; forming two metal layer coupling frames in the substrate; and folding the substrate over so that the two metal layer coupling frames are disposed one atop the other. A layer of insulating material may be provided between the two metal layer coupling frames. Each of the metal layer coupling frames may have a module opening and a slit. In at least one of the metal layer coupling frames, the slit may extend from a peripheral edge of the coupling frame to the module opening in the coupling frame. The metal inlay may be supported by struts (SRTs) connected to a metal frame (MF).

According to some embodiments (examples) of the invention, a smartcard (SC) may comprise: a card body (CB) having a module opening (MO) for receiving a transponder chip module (TCM) with a module antenna (MA), and a slit (S) extending from a peripheral edge of the card body towards an interior area of the card body; and a flexible circuit (FC) having a coupling loop structure (CLS) with an antenna structure (AS) disposed near the transponder chip module for coupling with the module antenna. The card body may be a metal card body (MCB). The flexible circuit (FC) may be connected to termination points (TP) near the slit (S). A patch antenna (PA) may be disposed near or overlying the slit The metal card body (CB) with slit (S), and optionally a module opening (MO), may function as a coupling frame (CF).

According to some embodiments (examples) of the invention, a smartcard (SC) may comprise: a card body (CB); a coupling frame antenna (CFA) comprising a single track extending almost entirely around a peripheral area of the card body (CB), and having two spaced-apart ends with termination end points (TP). The track may be a single wide track (as opposed to a structure having many tracks), and the track may have width of approximately 3 mm. The termination end points may be connected with a flexible circuit (FC) disposed with a coupling loop structure (CLS) including an antenna structure (AS) located under the module antenna (MA) of a transponder chip module (TCM).

According to some embodiments (examples) of the invention, a smartcard (SC) may comprise a front card body (FCB) comprising an anodized metal layer (ML) with a slit (S). Contact pads (CP) for effecting a contact interface may protrude through a plurality of individual openings (e.g., one per contact pad) in the metal layer. The smartcard may further comprise a rear card body (RCB) with a coupling loop structure (CLS) for coupling with the slit and with a module antenna (MA) of a transponder chip module (TCM). The coupling loop structure (CLS) may comprise a flexible circuit (FC). The rear card body may fit into a recess in a rear surface of the front card body. The metal layer may comprise one or more alloying elements from the group consisting of: copper, magnesium, manganese, silicon, tin and zinc, and combinations thereof.

According to some embodiments (examples) of the invention, a smartcard (SC) may comprise a card body (CB) comprising a metal layer (ML) or metal card body (MCB) having a module opening (MO) and a slit extending from a peripheral edge of the card body to the module opening; wherein the slit is shaped to suggest at least a portion of a readily recognizable object, or logo. The portion of the object of logo forming the slit may be an incomplete outline of the object or logo; and some remaining portions of the outline, making the saxophone more recognizable, may be engravings (or markings) which have only an aesthetic purpose, and no "functional" purpose.

According to some embodiments (examples) of the invention, a method of making a coupling frame for a smartcard may comprise: providing a metal layer (ML) or a metal card body (MCB) for a smartcard (SC); forming a slit (S) in the metal layer or metal card body so that the metal layer or metal card body will function as a coupling frame (CF); applying a light-curable, metallic ink to the metal layer or metal card body, wherein the ink fills the slit; and applying light radiation so that in a manner that the ink becomes conductive at areas other than the slit, and remains non-conductive in the slit.

According to an embodiment of the invention, a smartcard (SC) may comprise: a metal layer (ML); and a module opening (MO) in the metal layer (TCM) for receiving a transponder chip module (TCM); and may be characterized by: a slit (S) or notch (N) extending into the metal layer (ML) for a short distance to a periphery of the metal layer (ML) but not extending to the module opening (MO) to maintain mechanical integrity of the smartcard (SC); wherein the metal layer (ML) comprises an open-loop coupling frame (CF) having termination end points (TPs) on each side of the slit (S) or notch (N) for connecting to a flexible circuit (FC) disposed with a coupling loop structure (CLS). The smartcard (SC) may be characterized by: a coupling frame (CF) with termination end points (TPs) electrically connected to a flexible circuit (FC) disposed with a coupling loop structure (CLS); wherein the coupling loop structure (CLS) on the flexible circuit (FC) resides in close proximity to the antenna structure (AS) or module antenna (MA) of the transponder chip module (TCM); and a portion of the coupling loop structure (CLS) overlaps a portion of the antenna structure (AS) or module antenna (MA) in the transponder chip module (TCM). Alternatively, another portion of the CLS may overlap a slit in the coupling frame.

According to an embodiment of the invention, a smartcard (SC) may comprise: a non-conducting anodized aluminum card body and a slit extending from a perimeter edge to a position close to a module pocket disposed in the card body. The module pocket may be configured to receive at least one of: a contactless chip module or a dual interface chip module, and an antenna structure (AS) on a flexible circuit (FC) for inductive coupling with a module antenna (MA). The anodized aluminum card body may comprise one or more alloying elements of the group consisting of: copper, magnesium, manganese, silicon, tin and zinc, and a combination thereof.

According to an embodiment of the invention, a smartcard (SC) may comprise: a metal layer (ML) or a metal card body (MCB) with a discontinuity (such as a slit S) to function as a coupling frame (CF), wherein: the discontinuity has a pattern of cut slits and engraved slits that represent a name such as a payment scheme or a character, to disguise or camouflage the presence of said discontinuity. The discontinuity may be filled, deposited or inkjet printed with a flexible polymer resin and further camouflaged with a primer and ink.

According to an embodiment of the invention, a smartcard (SC) may comprise: a card body (CB) comprising a stack-up of at least two metal layers, each of the metal layers (ML) having a discontinuity in the form of a slit (S) extending through the layer from an outer edge of the layer to an interior position thereof; wherein at least one of the metal layers is suspended from a metal frame (MF) by means of supporting struts. At least one of the metal layers may extend from edge-to-edge on the card body. There may be two metal layers which are folded over on each other (along a line of perforations) to create a metal core.

According to an embodiment of the invention, a method of manufacturing a shrouded metal inlay for a smartcard may comprise: providing a metal core layer having a plurality of sites, with each site corresponding to an individual smartcard; disposing PVC layers on the front and back of the metal core layer; and digitally printing at least one of the PVC layers. The sites or metal card bodies may be arranged in an array having rows and columns, wherein each site is supported by struts emanating from a metal frame.

The invention makes use of the surface eddy currents which flow along the perimeter edge of a conductive surface such as a metal card body (MCB) which has been exposed to electromagnetic waves generated by a contactless reader or terminal. The intensity of such eddy currents at the frequency of interest is a maximum along the skin depth of the metal at its perimeter edge. The skin depth of copper, for example, at 13.56 MHz is approximately 18 µm.

The distance in which the slit (S) or notch (N) needs to extend from the perimeter edge across the metal layer (ML) or metal card body (MCB), concentrating the surface current density, needs to be a substantial multiple of the skin depth distance to facilitate the diversion of current. Notably, the slit (S) or notch (N) passes entirely through the metal layer (ML, MCB).

Smartcards (SC) having (i) a metal card body (MCB) with a short slit (S) or notch (N) extending into the metal card body (MCB) acting as a coupling frame (CF) having a termination end point (TP) on each side of the slit (S) or notch (N), (ii) a flexible circuit (FC) disposed with a coupling loop structure (CLS) having termination end points (TPs) for electrical connection to the termination end points (TPs) on the coupling frame; (iii) a module opening (MO) in the metal card body (MCB) to accept a transponder chip module (TCM) having a module antenna (MA) connected to an RFID chip; (iv) the coupling loop structure (CLS) having a frame or spiral shape antenna structure (AS) on the flexible circuit (FC), assembled underneath the module antenna (MA) of the transponder chip module (TCM) so that a portion of the module antenna overlaps a portion of the antenna structure (AS) to allow for inductive coupling; (v) a recess (R) may be formed in the metal card body (MCB) to house the flexible circuit (FC) which extends from the area surrounding the slit (S) or notch (N) to the area of the module opening (MO), and may further comprise an anti-shielding material between the flexible circuit (FC) and the metal card body (MCB); and (vi) the slit (S) or notch (N) in the metal card body does not extend to the module opening (MO) thus maintaining the mechanical integrity of the smartcard (SC). The form of the slit in a metal card body may resemble a saxophone or be u-shaped. Such cards may be contactless only, contact only, or may be dual-interface (contact and contactless) cards.

One aspect of the invention comprises a transaction card having a non-conducting anodized aluminum card body may comprise one or more pockets or recesses, and at least one of a magnetic stripe, a laser signature panel, a hologram, and having an issuing bank and payment scheme logo laser etched or CNC milled into the card body.

In an additional aspect of the invention, the slit or slits (S) in the metal layers (ML, MCB) extend from a perimeter edge to an area close to the module pocket (MO), or the slit or slits (S) commence from an area within the metal layer (ML) to the opening of the module pocket (MO). An antenna structure (AS) as part of a coupling loop structure (CLS) is closely coupled to the slit or slits. The antenna structure (AS) may touch the non-conducting anodized aluminum layer. Another antenna structure (AS) as part of the coupling loop structure (CLS) is closely coupled to the module antenna (MA) of the transponder chip module (TCM).

The antenna structure (AS) may be used to pick-up surface currents around a discontinuity in the anodized aluminum or stainless steel layer, and such antenna structure (AS) may run perpendicular or parallel to the direction of the discontinuity. The antenna structure (AS) may wrap around partially or entirely the discontinuity in the form of a slit (S) or the antenna structure (AS) may meander within the open area of the slit (S).

Another aspect of the invention includes a transaction card comprising of non-conducting anodized aluminum which may be used to house electronic components without the need to take measures to isolate/separate the electronics from the metal. A flexible circuit (FC) with an antenna structure/AS) may be attached directly to the anodized aluminum and in particular to overlap a slit (S) and or opening (MO) for inductive coupling when the metal card body is exposed to an electromagnetic field generated by a reader.

In a further aspect of the invention, the contact pads (CP) may protrude from openings in the non-conducting anodized card body, and may be located at the ISO positions (C1 . . . C8) defined by ISO 7816.

In an embodiment of the invention, the slit (S) may form a pattern of machined slits in the metal layer (ML) or metal card body (MCB) that represent a name, character or special shape. The slits may be cut entirely through the metal or are engraved on the surface of the metal. The slit (S) may have the shape of a musical instrument such as a saxophone with the continuous slit mechanically engraved and or laser etched (cut) in a metal layer (ML) or metal card body (MCB) with the slit (S) passing entirely through the metal layer (ML) or metal card body (MCB). The slit may be camouflaged by graphic elements in which the slit (S) is part of the artwork and said slit may be straight and terminate in an opening (MO) having a shape other than rectangular.

In another embodiment of the invention, different layers applied to a metal surface (metal inlay) may disguise the presence of a discontinuity in the metal layer of metal card body by using primer, polymer coatings (synthetic resin), and ink. The finish may be gloss or matte. The resin may be laser engravable.

According to the invention, generally, an embedded metal smartcard operating in a contactless mode, including dual interface (contact and contactless) smartcards may have a metal inlay (MI) composing of a coupling frame (CF) with a slit (S) to concentrate surface eddy current density around the antenna structure (AS) or module antenna (MA) of a transponder chip module (TCM). The metal inlay (MI) may further compose of a metal frame (MF) supporting a coupling frame (CF). The coupling frame (CF) may be a single metal layer or be composed of two metal layers separated by a dielectric layer and laminated together to form a pre-laminated metal inlay.

The coupling frame (CF) represents the core metal layer or layers (pre-laminated) of a metal card body (MCB), in the form of a DI embedded metal smartcard (aka DI metal core smartcard & DI metal veneer smartcard), having a plastic front and plastic rear sandwiching the single metal layer or the pre-laminated metal layers. The coupling frame (CF) or an array of coupling frames in a given inlay format is or are laser or water cut from a metal sheet or from a reel (web) of metal. The metal sheet or metal reel comprising an array of metal inlay sites may accommodate a front and rear metal layer in a two-layer inlay construction having a perforated center allowing for the folding of the front metal layer over the rear metal layer separated by a dielectric. The metal inlay may further comprise a metal frame (MF) which supports the coupling frame (CF) by means of struts.

In other words, a single metal layer, or two metal layers which are later folded over on each other, may form the core of a metal card body (MCB). The folded metal layers may be electrically separated from each other by a dielectric layer having an adhesive backing on each side. The single metal layer or the folded metal layers (with dielectric layer) may be regarded as a metal inlay (MI) site composed of a metal frame (MF) supporting a coupling frame (CF) which later forms the metal card body (MCB). The cutting process to produce a metal inlay (MI) is performed in such a way so that the coupling frame (CF) is suspended by struts from the metal frame (MF). The metal inlay may also be formed through chemical etching.

An object of the invention is to avoid CNC milling of the individual card body from a metal inlay site after plastic and adhesive layers (front and rear) have been laminated to the metal inlay (MI). CNC milling is a costly process in terms of manufacturing time. And instead, the metal card body (MCB) is physically cut or punched from the metal frame (MF) supported by the struts. The supporting struts can be on one metal layer in the case of the folded metal layers separated by a dielectric layer, or the struts may support a single metal layer. The metal layers may have a thickness of 150 μm with an inner dielectric layer having a thickness of 25 or 50 μm, while a single metal layer may have a thickness of 350 μm. The "edge to edge" metal provides weight and structure to the DI smartcard. The slit (S) in a single metal layer or slits (S) in the laminated metal layers may extend from a perimeter edge to the module opening (MO), or the slit or slits may not extend to the module opening (MO). The slit or slits may be straight, curved or meandering in form. During the laser or water cutting process, the edges of the coupling frame may be dulled to remove sharp edges. In a final lamination process, the metal inlay with one card body site or a plurality of card body sites is laminated with front and rear white plastic layers (including adhesive layers) so that the metal inlay is completely shrouded with white plastic, in preparation for digital printing. Alignment holes (ah) in the metal inlay may facilitate the precise cutting or punching of the individual card bodies from the pre-laminated sheet (shrouded) having a thickness of approximately 600 μm. Proper selection of adhesive in the card construction maintains the metal sound effect when tossed on a hard surface.

Dual interface embedded metal transaction cards for processing in instant issuance machines are described in terms of their card construction and mechanical characteristics, leaning on the abovementioned embodiments.

The techniques described herein may equally be applicable to dual interface embedded metal cards produced using traditional offset printing. Equally, the techniques may be applicable in producing contactless smartcards without a contact interface.

In their various embodiments, the invention(s) described herein may relate to industrial and commercial industries, such RFID applications, payment smartcards (metal, plastic or a combination thereof), electronic credentials, identity cards, loyalty cards, access control cards, and the like.

Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying drawing figures (FIGS.). The figures may generally be in the form of diagrams. Some elements in the figures may be stylized, simplified or exaggerated, others may be omitted, for illustrative clarity.

Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein.

Some elements may be referred to with letters ("AS", "CBR", "CF", "CLS", "FC", "MA", "MT", "TCM", etc.) rather than or in addition to numerals. Some similar (including substantially identical) elements in various embodiments may be similarly numbered, with a given numeral such as "310", followed by different letters such as "A", "B", "C", etc. (resulting in "310A", "310B", "310C"), and may collectively (all of them at once) referred to simply by the numeral ("310").

Figure 1:
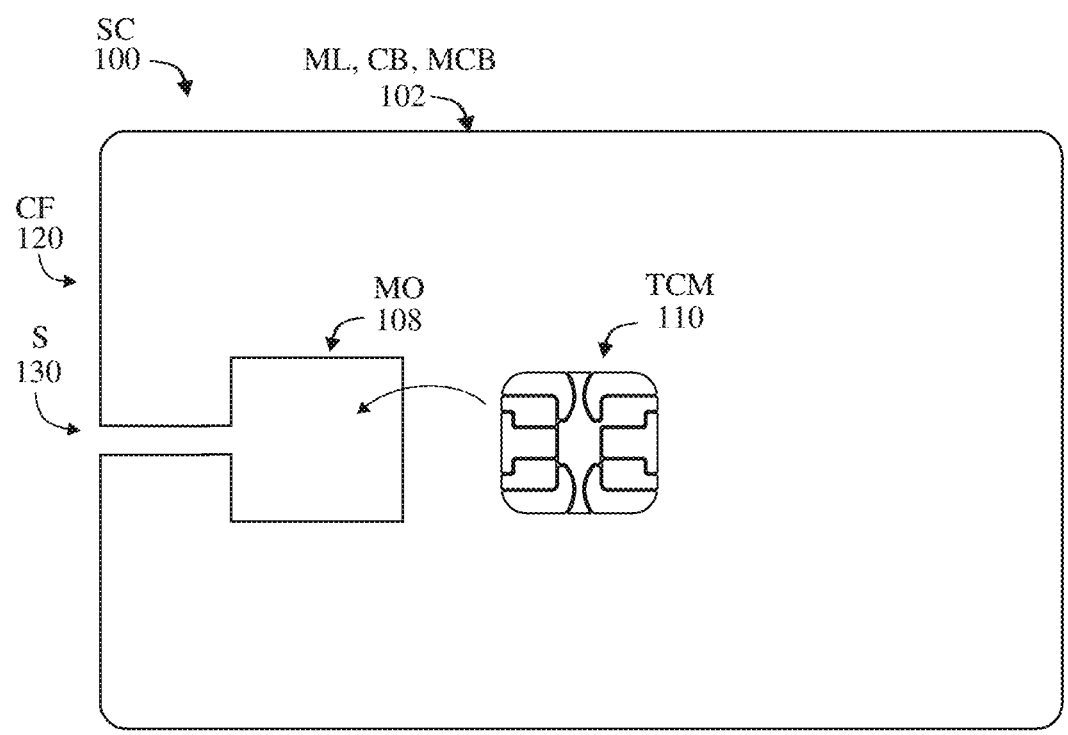
Figure 3:
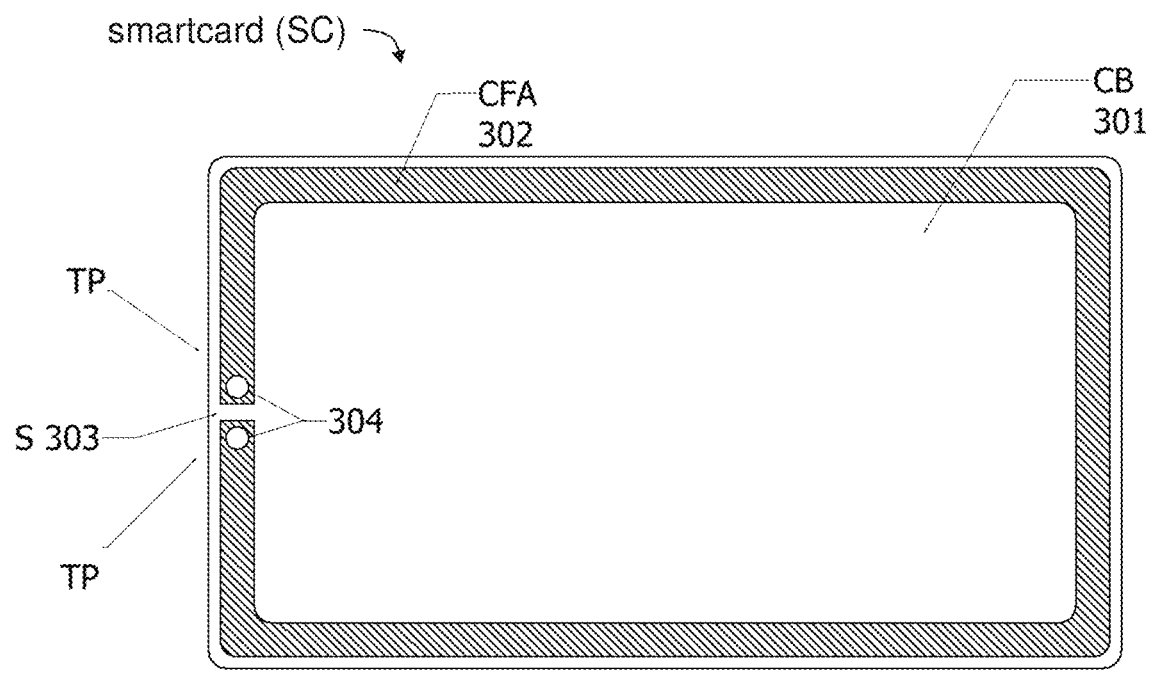

FIG. 1 (compare FIG. 3 of U.S. Pat. No. 9,836,684) is a diagrammatic view of a front surface of a smartcard (SC) which may be a metal card, composite metal card, encapsulated metal card, metal core card or metal hybrid card having a slit (S) to function as a coupling frame (CF), according to the prior art.

Figure 2:
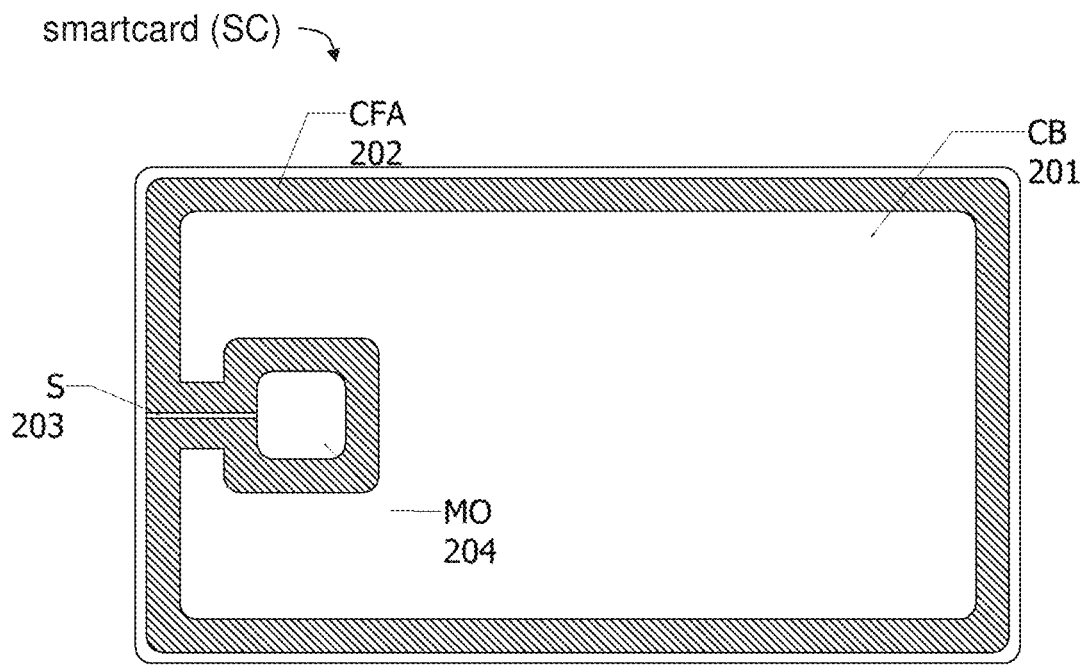

FIG. 2 (compare FIG. 2 of US 2018/0341847) is a diagram, of an exemplary coupling frame antenna with a track width of 3 mm, according to the prior art.

FIG. 3 (compare FIG. 3 of U.S. 62/889,555) is a diagram of a single loop with a track width of 3 mm having termination points, according to the invention.

Figure 4:
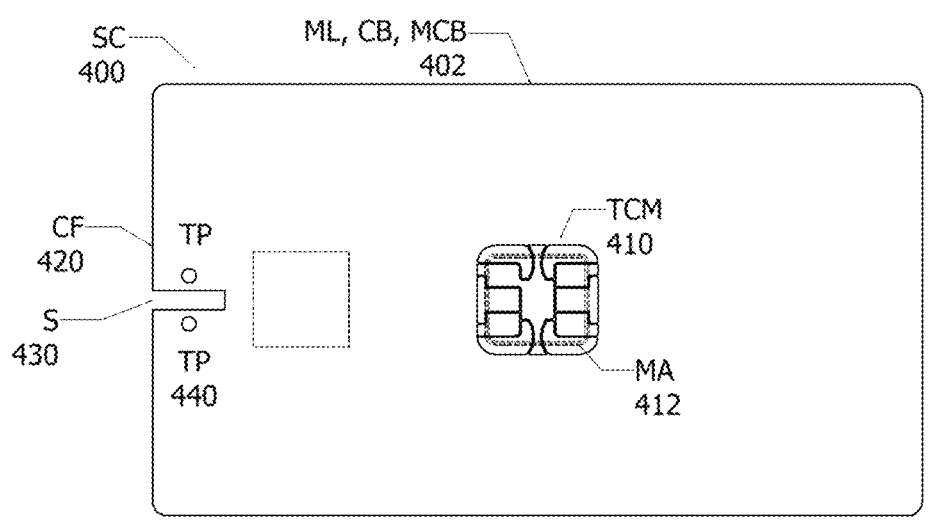

FIG. 4 (compare FIG. 4 of U.S. 62/889,555) is a diagrammatic view of a front surface of a smartcard (SC) which may be a metal card, composite metal card, encapsulated metal card, metal core card or metal face card having a slit (S) or notch (N) to function as a coupling frame (CF) with the slit (S) or notch (N) commencing at a perimeter edge and stopping short of the module opening (MO) with termination points located on both sides of said discontinuity, according to the invention.

Figure 5A:
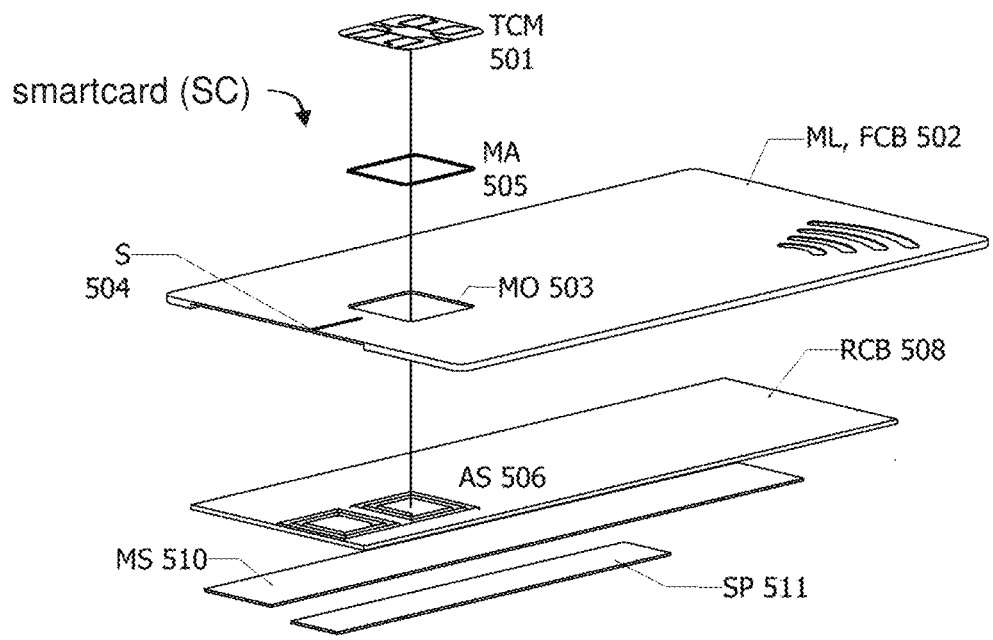

FIG. 5A (compare FIG. 5A of U.S. 62/891,308) is a diagram (exploded, perspective view) of an assembly of a metal card body composed primarily of a metal layer (ML) acting as a coupling frame (CF) with a slit (S) and a back-panel referred to as a "rear card body" (RCB) for fitting into a recess area in the metal card body, also referred to as a "front card body" (FCB), according to the invention.

Figure 5B:
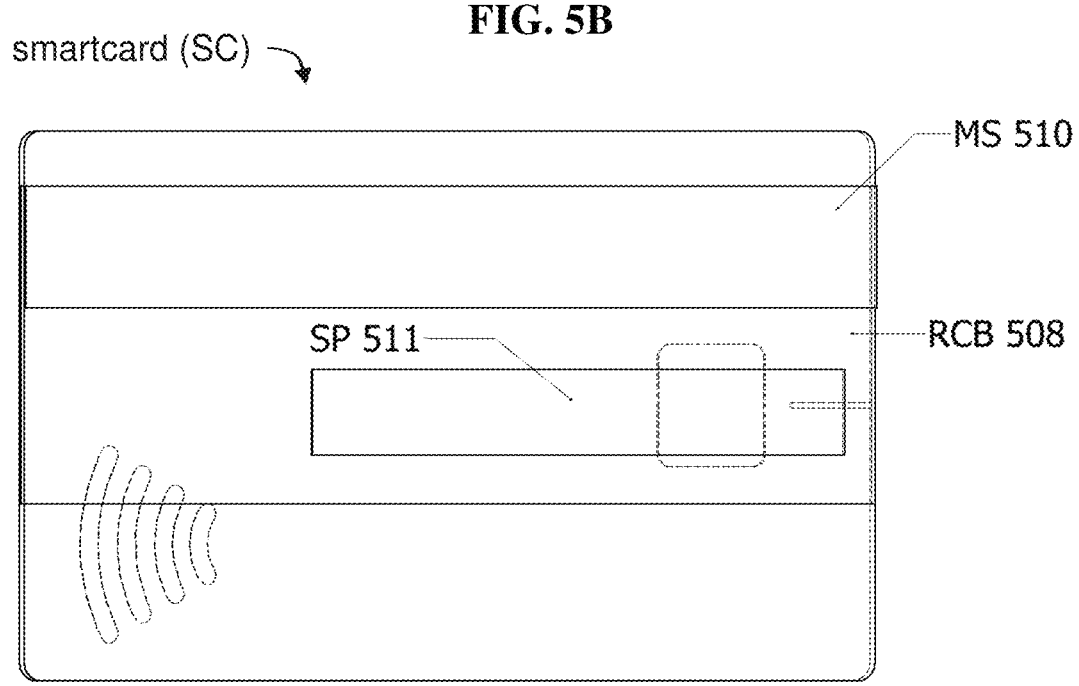

FIG. 5B (compare FIG. 5B of U.S. 62/891,308) is a diagram (rear view) illustrating the shape and features of the rear card body (RCB) housing the magnetic stripe (MS) and signature panel (SP), according to the invention. The rear card body may be made from a non-conducting material such as fabric, plastic, carbon glass fiber, paper, film, ceramic, glass, wood, stone or any composite material. The rear card body (RCB) may be made of metal featuring a slit or slits.

Figure 6:
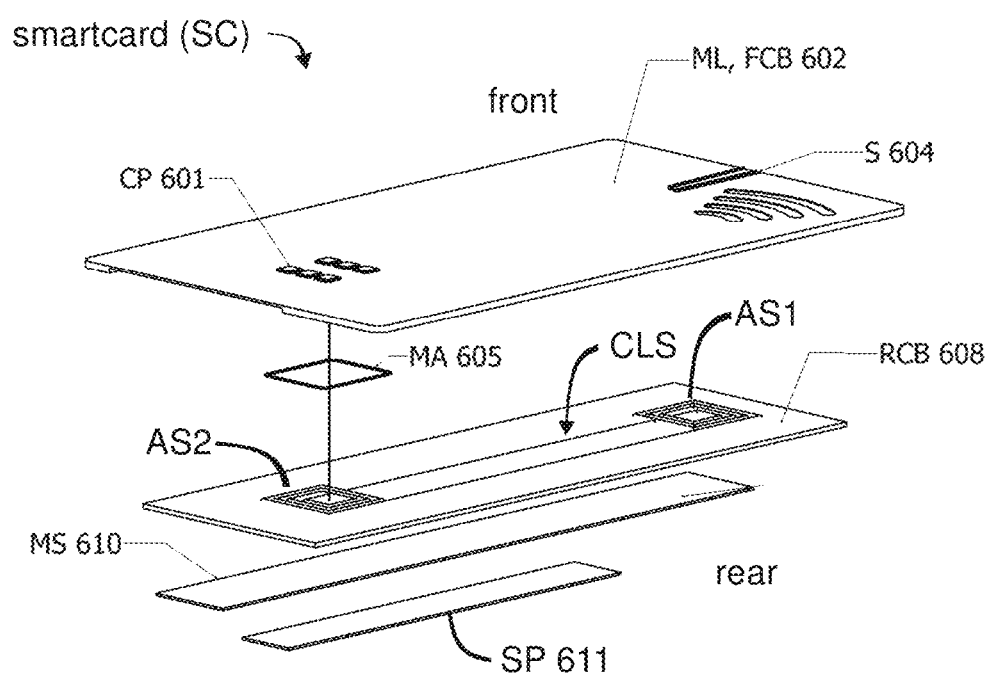

FIG. 6 (compare FIG. 6 of U.S. 62/891,308) is a diagram (exploded, perspective view) of an assembly of a metal card body comprising a front card body (FCB) which is a metal layer (ML) which has been anodized to be non-conductive (on its surfaces) and which has a slit (S), and contact pads protruding through the metal layer (ML, FCB), according to the invention. A smaller rear card body (RCB) has a coupling loop structure (CLS) with two antenna structures (AS1, AS2), and fits into a recess in the rear surface of the front card body (FCB). The antenna structures (AS) couple with the slit (S) and the module antenna (MA).

Figure 7A:
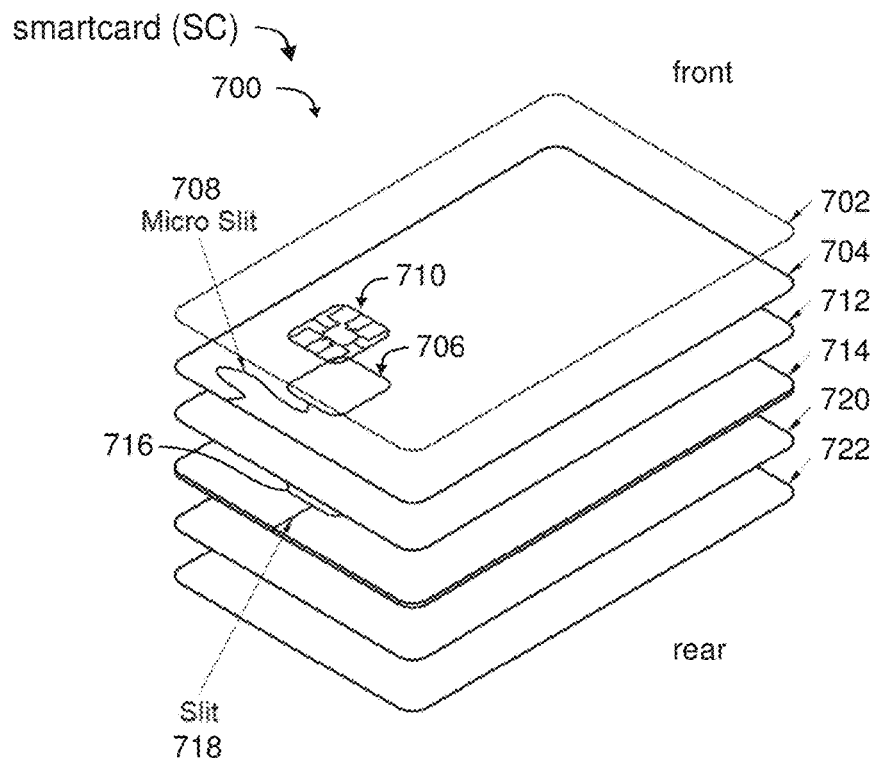
Figure 7B:
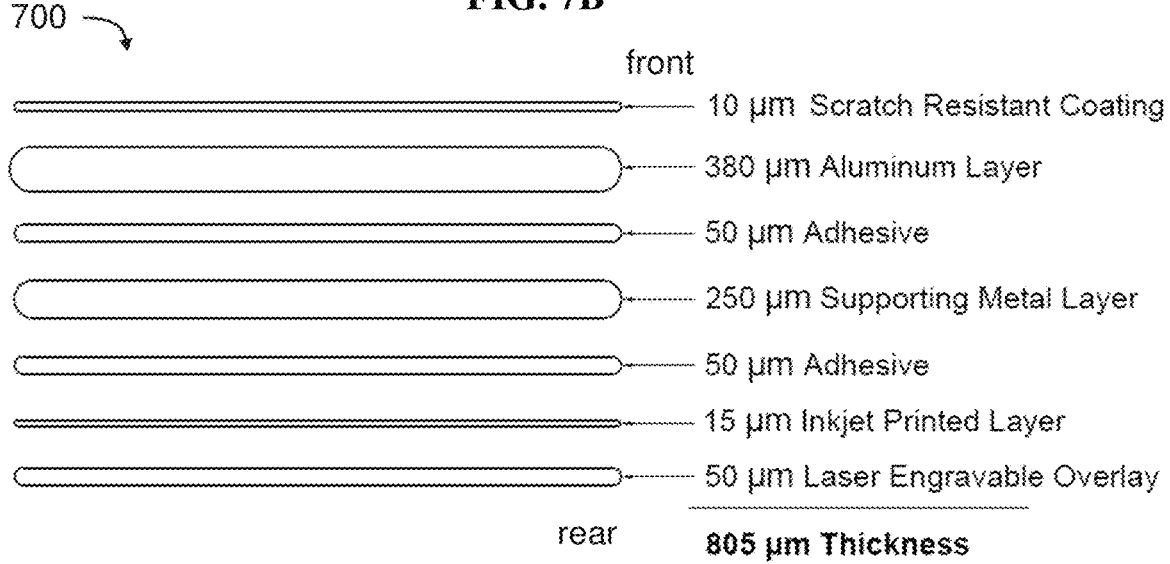

FIGS. 7A and 7B (compare FIG. 3 of U.S. 62/891,308) are diagrams—FIG. 7A is an exploded perspective view and FIG. 7B is an exploded cross-sectional view—of an exemplary transaction card construction comprising a non-conducting anodized aluminum layer on a stainless steel supporting layer, with no electrical connection between the metal layers, according to the invention. The slit may have a non-linear shape, such as a curvy shape resembling the outline of a saxophone (see FIG. 10A/B). Note that the ends of the various layers in of the card FIG. 7B are (in reality) square, not rounded (as shown).

Figure 8A:
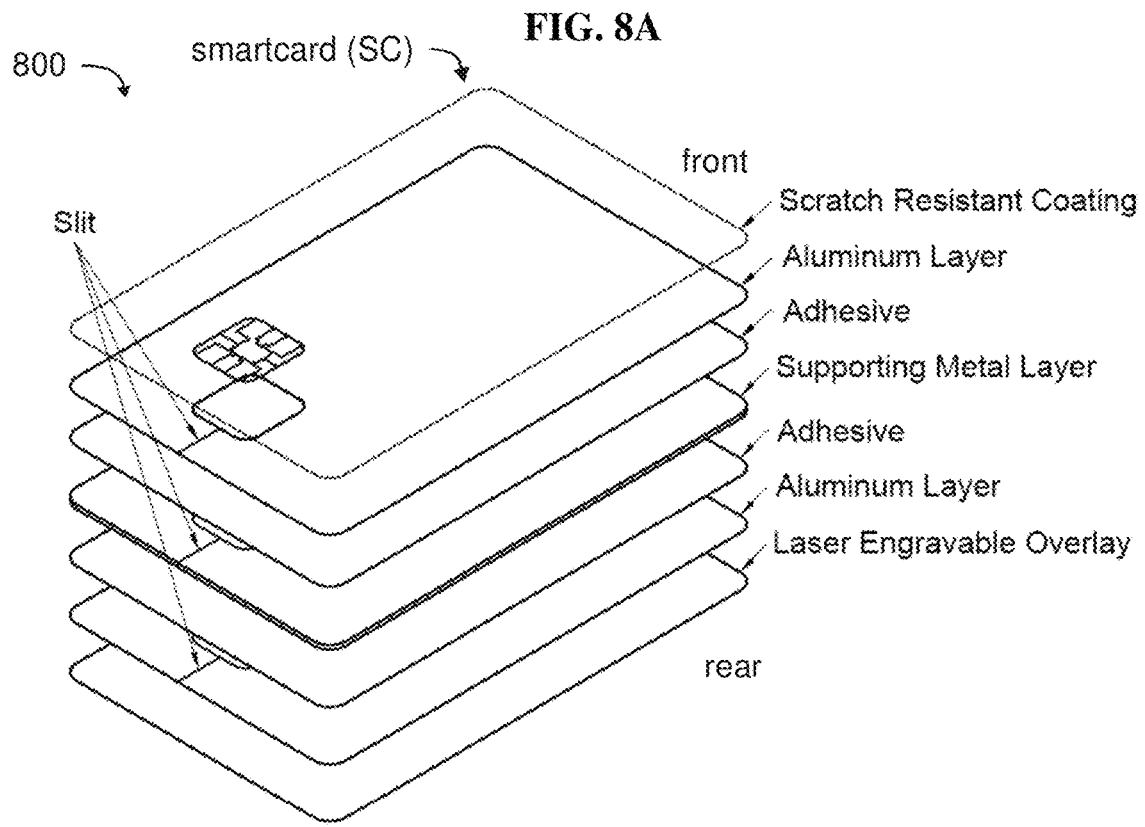
Figure 8B:
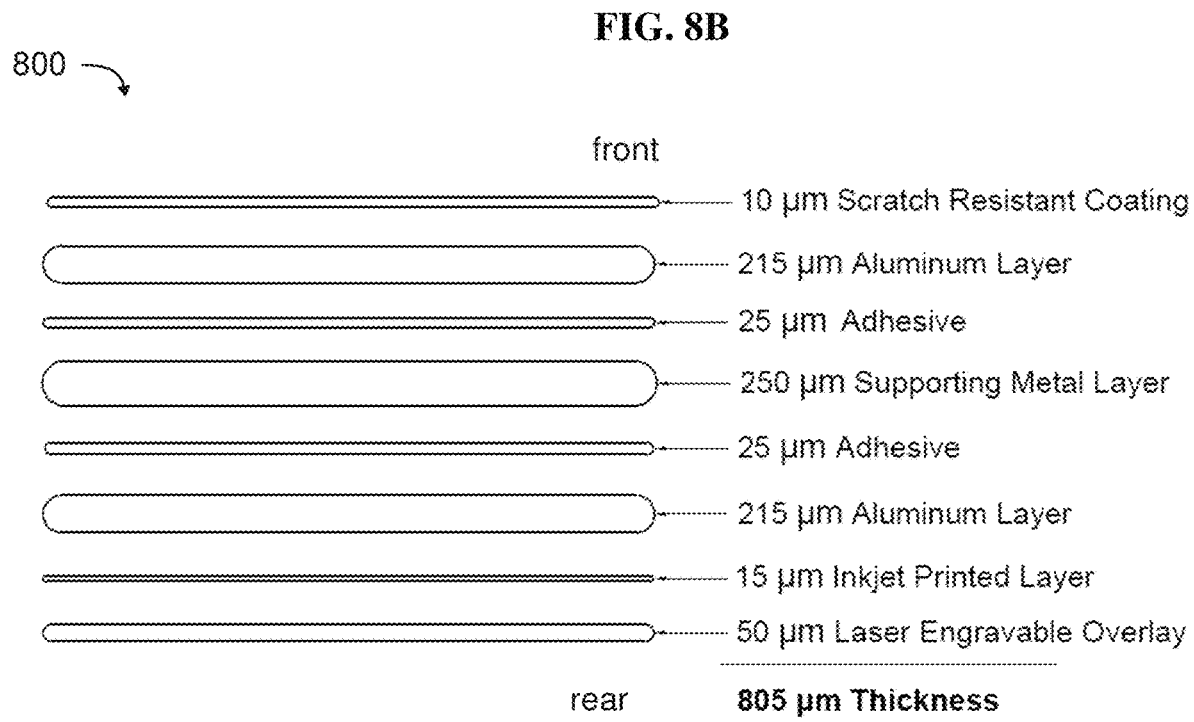

FIGS. 8A and 8B (compare FIG. 4 of U.S. 62/891,308) are diagrams—FIG. 8A is an exploded perspective view and FIG. 8B is an exploded cross-sectional view—of an exemplary transaction card construction comprising a stainless steel supporting layer with slit, a first non-conducting anodized aluminum layer with slit and a second non-conducting anodized aluminum layer with slit, according to the invention. The module pocket is configured to receive at least one of: a contactless chip module; a dual interface chip module. Internal to the card body construction an antenna structure is coupled to the slit (not shown). Note that the ends of the various layers in of the card FIG. 8B are (in reality) square, not rounded (as shown).

Figure 9A:
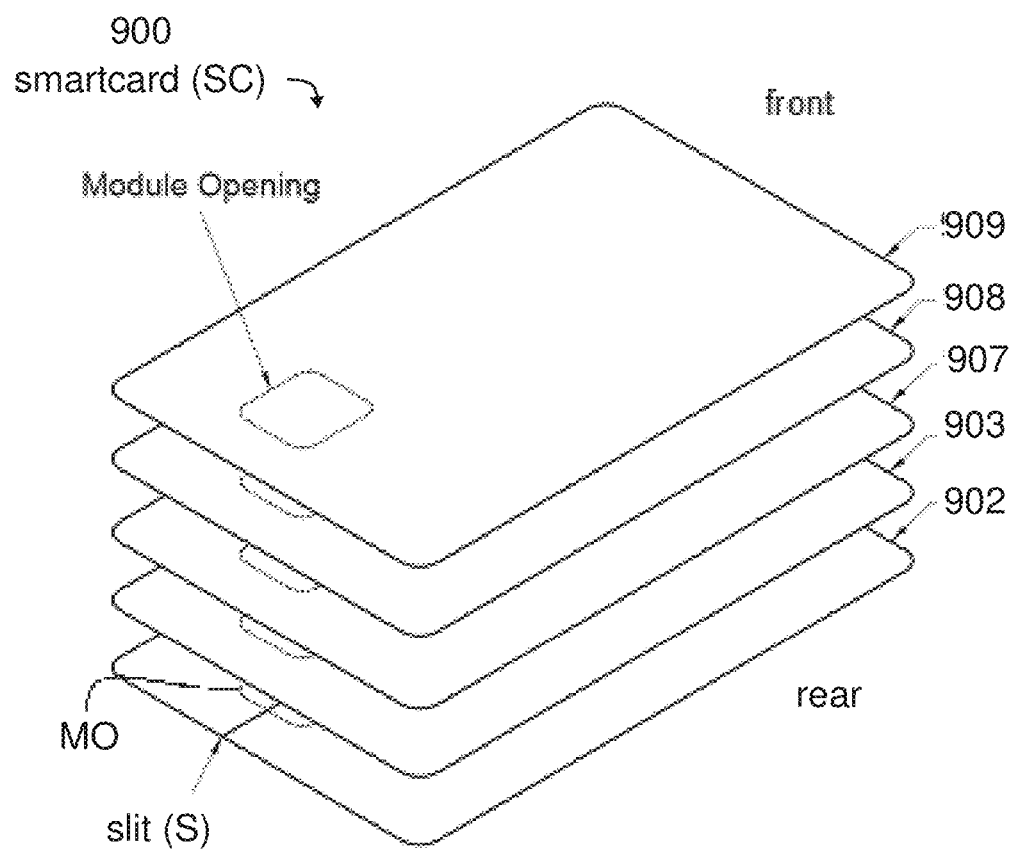

FIG. 9A (compare FIG. 6 of U.S. 62/894,976) is a diagram (exploded, perspective view) of a card stackup showing different layers applied to a metal surface (metal inlay) disguising the presence of a discontinuity by using primer, polymer coatings (synthetic resin), and ink, according to the invention.

Figure 9B:
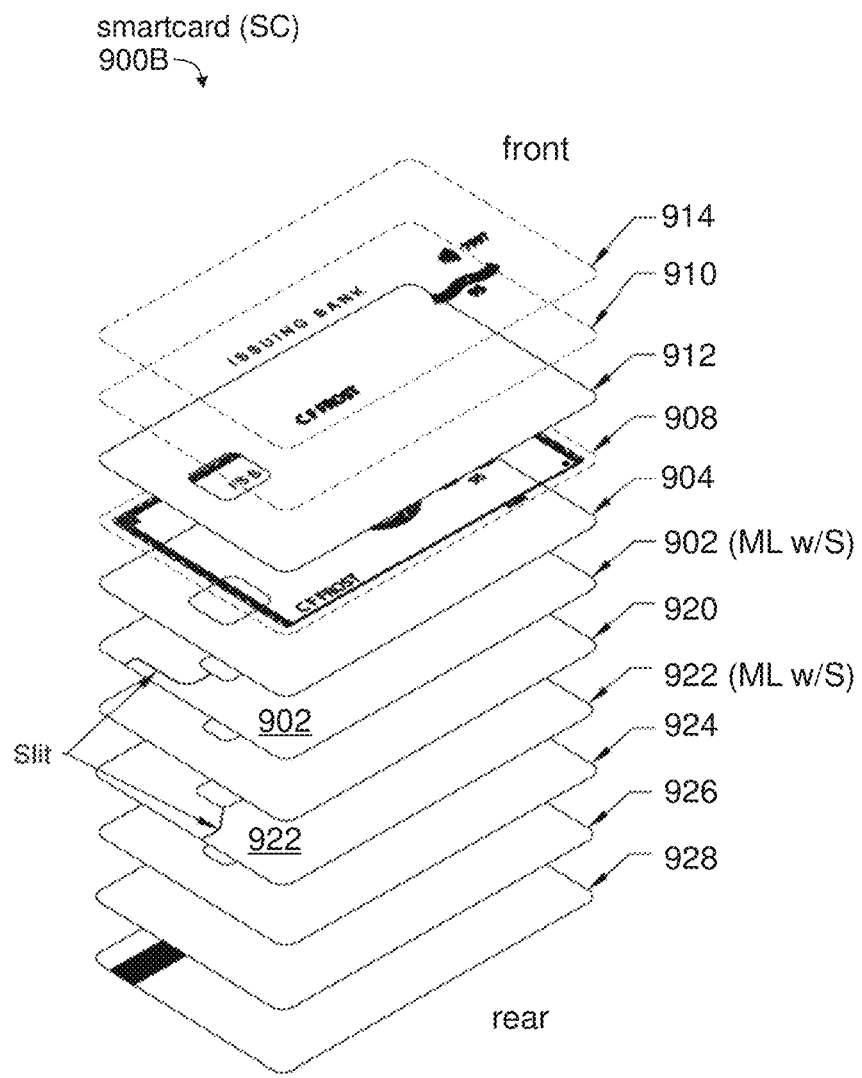
Figure 9C:
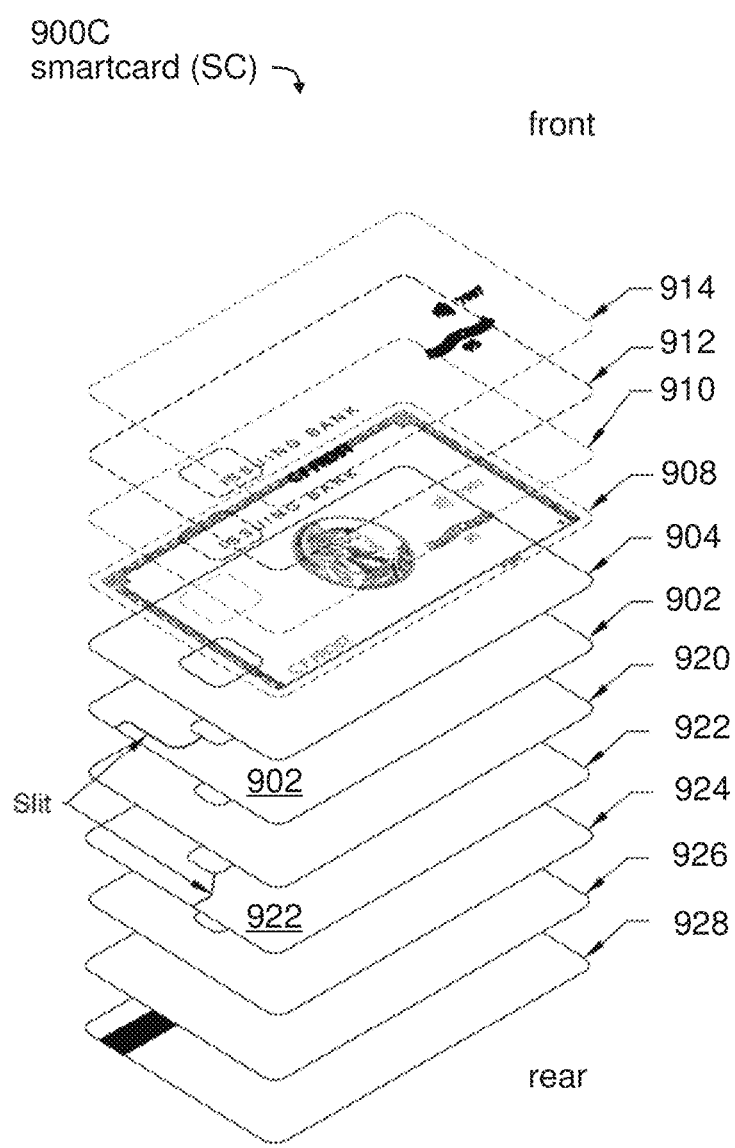
Figure 9D:
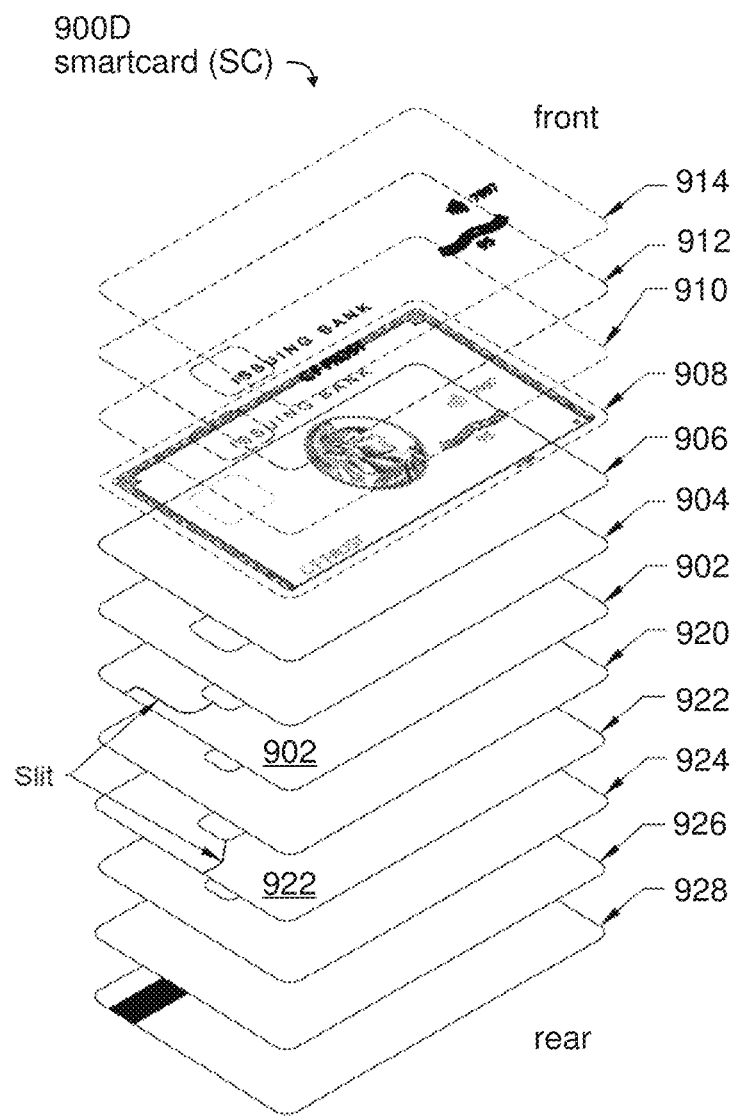

FIGS. 9B, 9C and 9D are diagrams (exploded, perspective view) of a card stack-up showing different layers of the card, according to the invention.

Figure 9E:
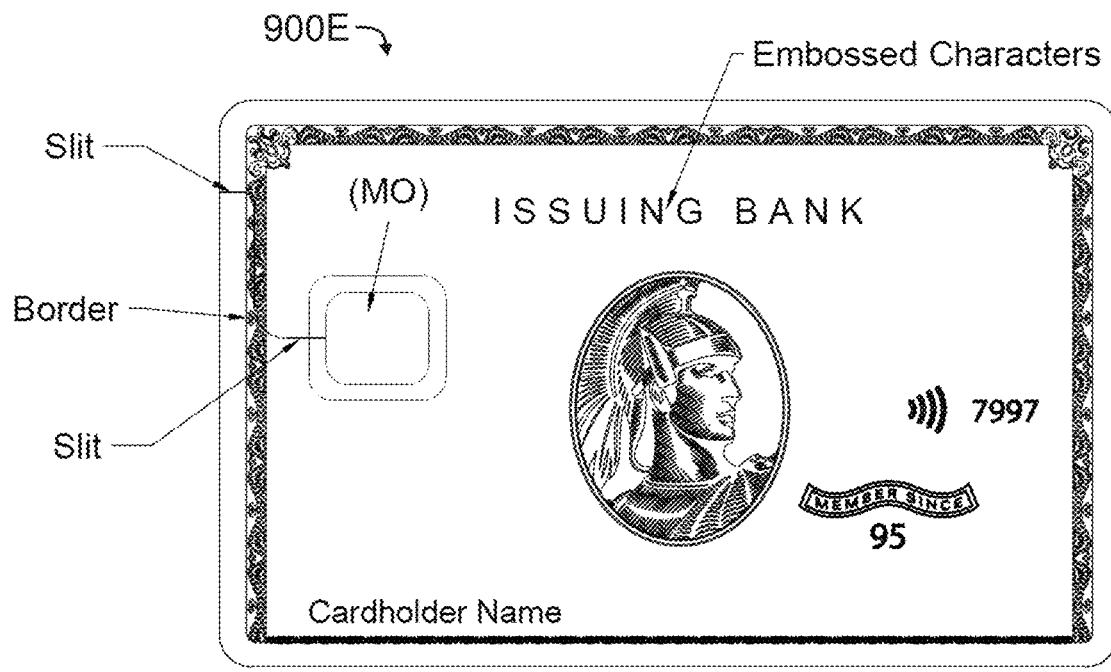
Figure 9F:
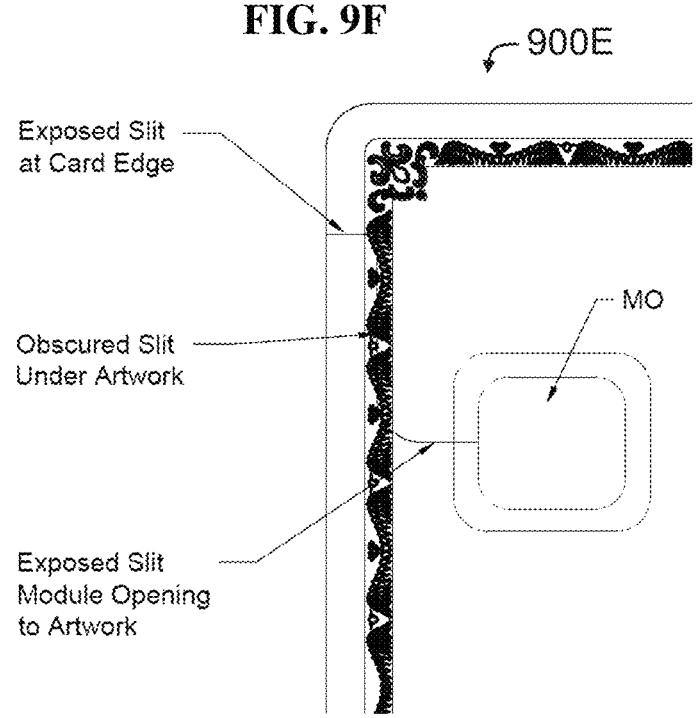
Figure 9G:
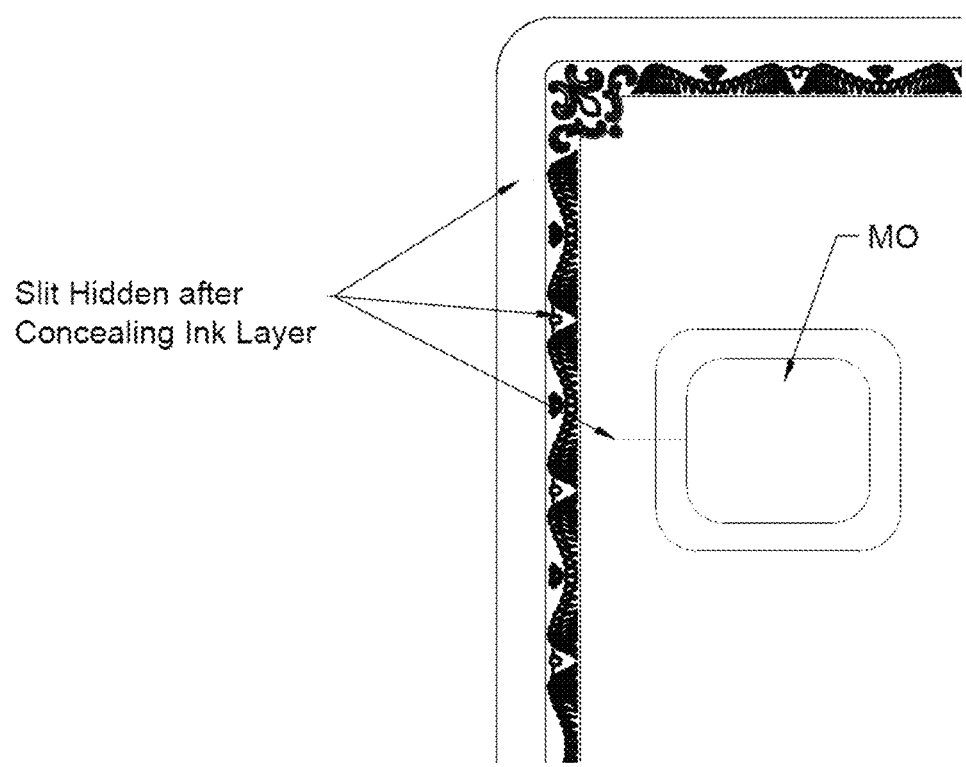

FIGS. 9E, 9F and 9G are diagrams (plan view) of smartcards (or selected portions thereof), according to the invention.

Figure 10A:
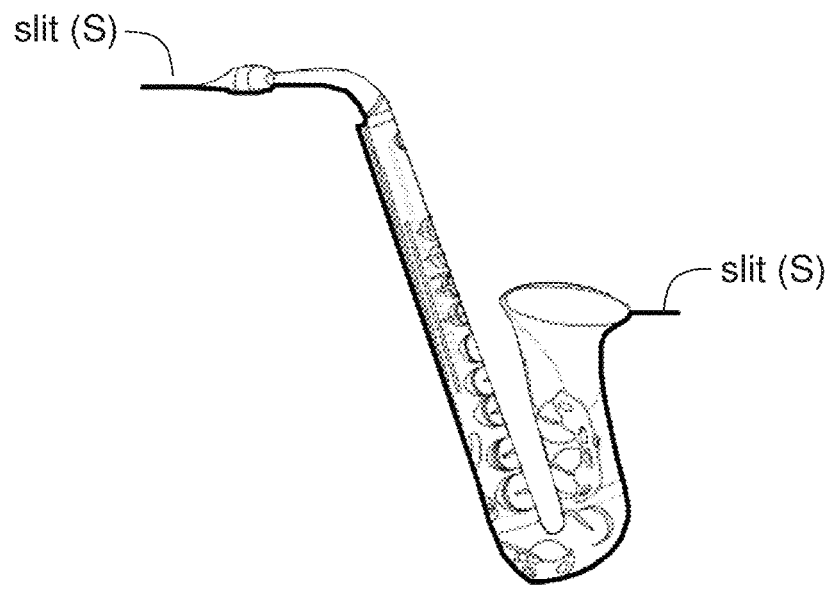

FIG. 10A (compare FIG. 3A of U.S. 62/894,976) is a sketch of a saxophone (neck, body, u-shaped bow and flared bell) in which a continuous slit passes through the instrument from the mouthpiece to the bell, accompanied by engravings to outline the structure of the instrument, according to the invention.

Figure 10B:
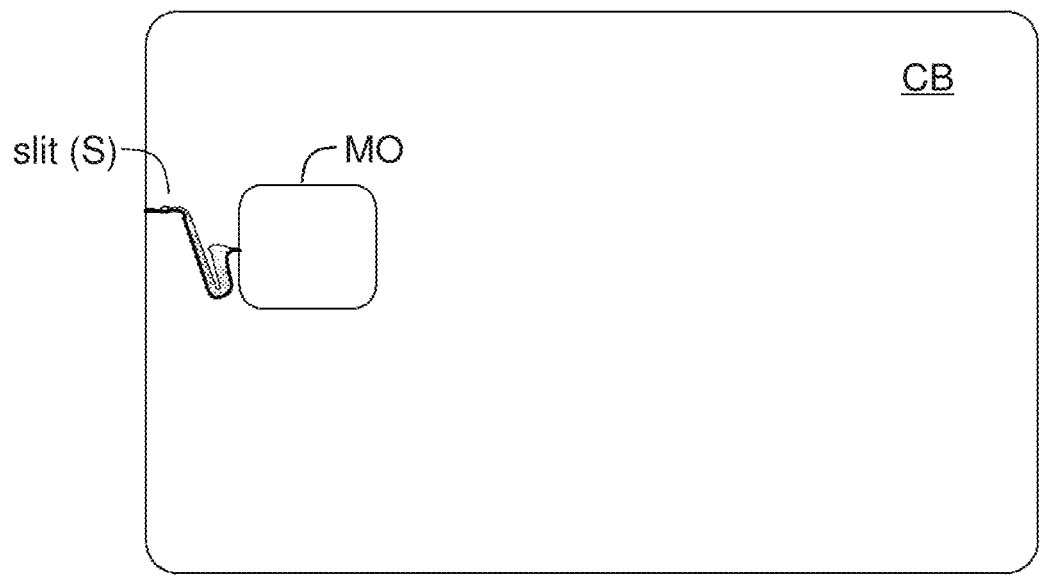

FIG. 10B (compare FIG. 3B of U.S. 62/894,976) is a sketch of a saxophone with a continuous slit mechanically engraved and or laser etched in a metal card body with the slit passing entirely through a metal layer or metal card body, according to the invention.

Figure 11A:

FIG. 11A (compare FIG. 5A of U.S. 62/894,976) is an icon representing the logo of the payment scheme "VISA" in which a continuous slit passes from the peak of the "V" to the bottom of the "A", according to the invention.

Figure 11B:

FIG. 11B (compare FIG. 5B of U.S. 62/894,976) is an icon representing the logo of the payment scheme "VISA" in which a continuous slit passes from the peak of the "V" to the top of the "I" and "S" and descending to the bottom of the "A", according to the invention.

Figure 11C:
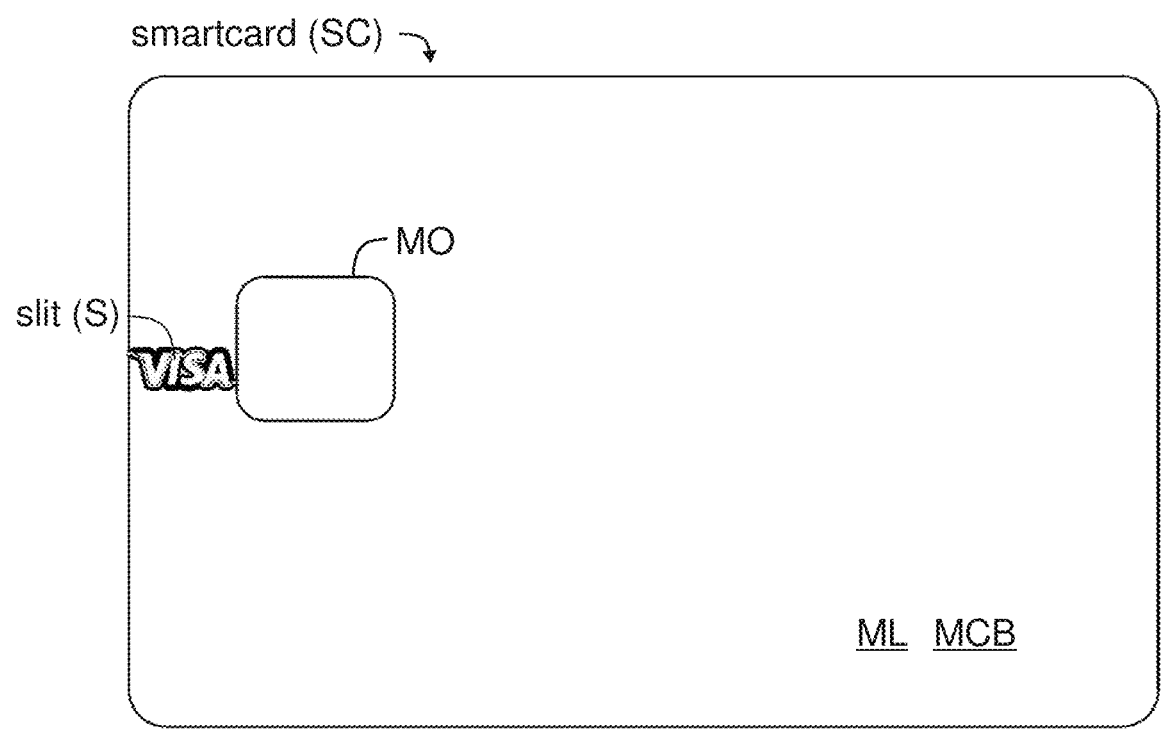

FIG. 11C (compare FIG. 5C of U.S. 62/894,976) is an icon representing the logo of the payment scheme VISA with a continuous slit mechanically engraved and or laser etched in a metal card body with the slit passing entirely through a metal layer or metal card body, according to the invention.

Figure 12:
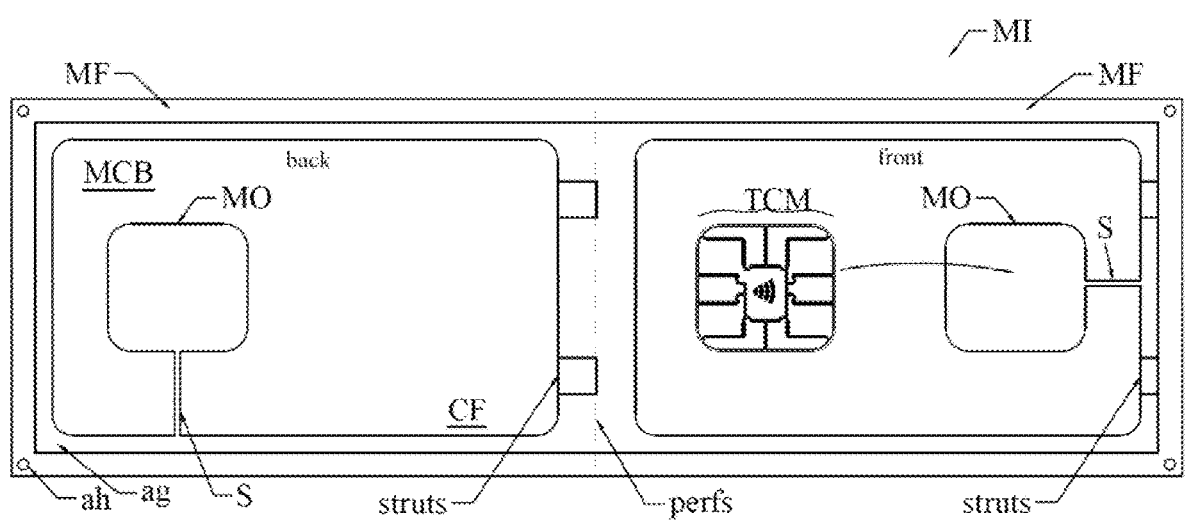

FIG. 12 (compare FIG. 4 of U.S. 62/979,422) is a diagrammatic view of a perforated metal inlay (MI) site with a metal frame (MF) formed by laser cutting, water cutting or chemical etching, featuring what will become a front layer and rear metal layer, each having a slit (S) and module opening (MO) to act as a coupling frame (CF), and the metal frame (MF) being supported by struts (SRTs) connected to said metal frame (MF) as part of the metal inlay (MI), according to the invention.

Figure 13:
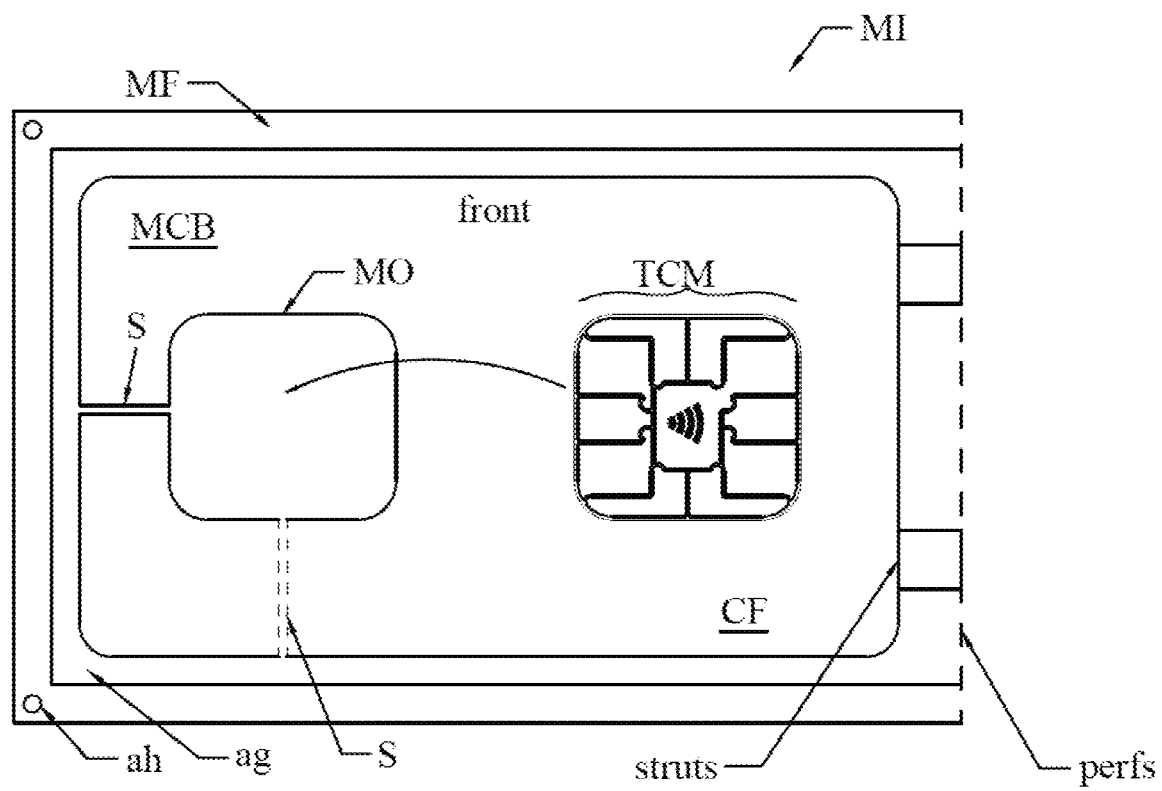

FIG. 13 (compare FIG. 5 of U.S. 62/979,422) is a front view of a metal inlay (MI) in which the front and rear metal layers, comprising a metal frame (MF) supporting a coupling frame (CF), are folded over on each other at the point (along a line) of perforations (perfs) to create a two-layer metal sandwich, according to the invention.

Figure 14:
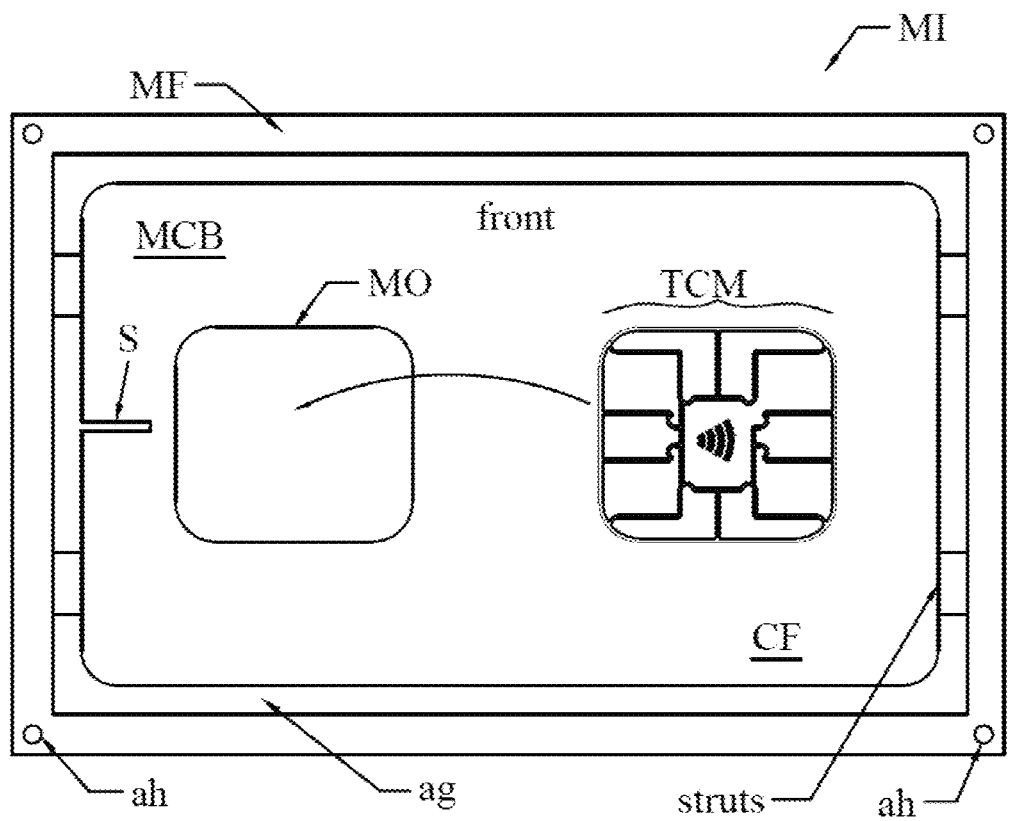

FIG. 14 (compare FIG. 6 of U.S. 62/979,422) is a front view of a metal inlay (MI) site with a coupling frame (CF) which is suspended from a metal frame (MF) using supporting struts, according to the invention.

Figure 15A:
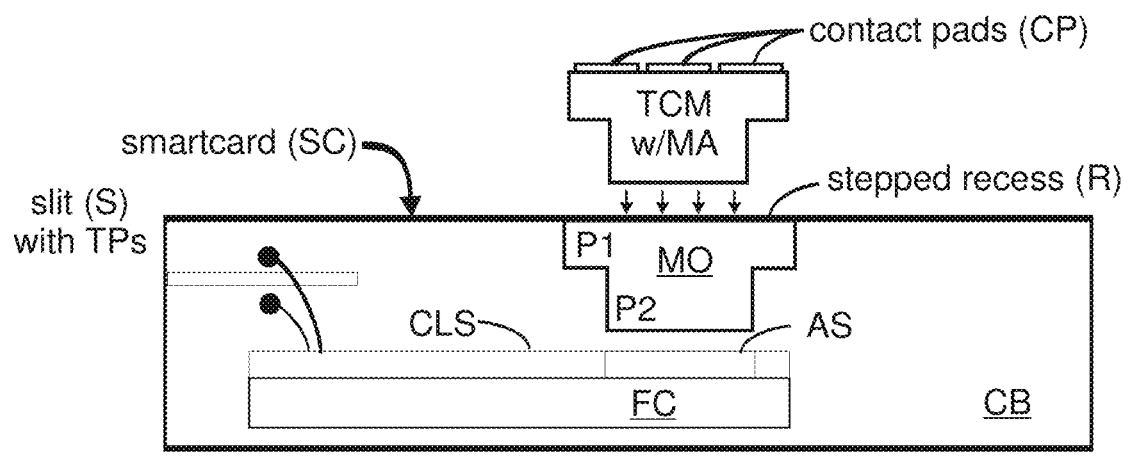

FIG. 15A is a diagram (cross-sectional view) of a smartcard (SC) with a coupling loop structure (CLS) connected with termination points (TP) of a coupling frame (CF), according to the invention.

Figure 15B:
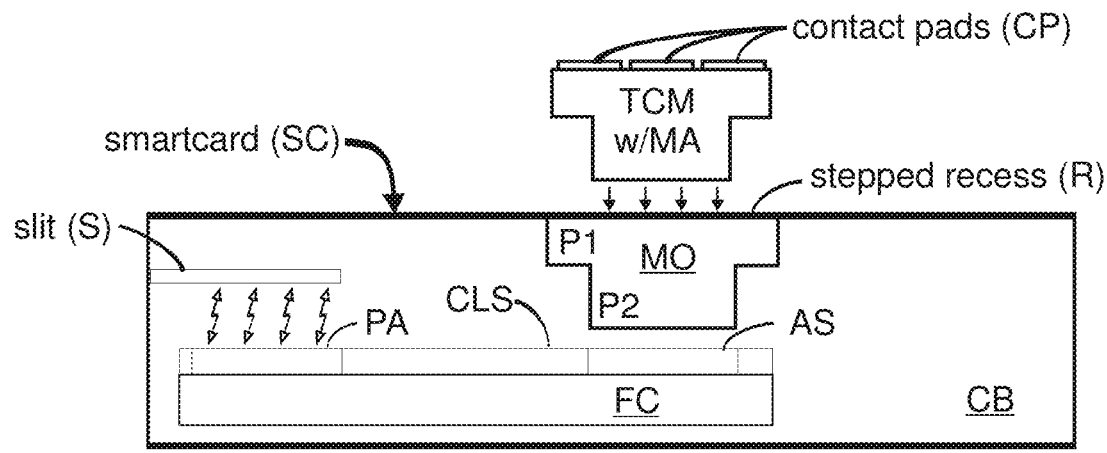

FIG. 15B is a diagram (mostly cross-sectional view) of a smartcard (SC) with a coupling loop structure (CLS) having a patch antenna (PA) for coupling with the slit (S) of a coupling frame (CF), according to the invention.

DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget").

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Reference may be made to disclosures of prior patents, publications and applications. Some text and drawings from those sources may be presented herein, but may be modified, edited or commented to blend more smoothly with the disclosure of the present application.

In the main hereinafter, RFID cards and electronic tags in the form of pure contactless cards, dual interface cards and electronic identity cards may be discussed as exemplary of various features and embodiments of the invention(s) disclosed herein. As will be evident, many features and embodiments may be applicable to (readily incorporated in) other forms of smartcards, such as EMV payment cards, metal composite cards, encapsulated metal cards, solid metal cards, metal veneer cards, metal hybrid cards, metal foil cards, access control cards and secure credential cards. As used herein, any one of the terms "transponder", "tag", "smartcard", "data carrier", "wearable device" and the like, may be interpreted to refer to any other of the devices similar thereto which operate under ISO 14443 or similar RFID standard.

This disclosure relates to the field of RFID-enabled metal transaction cards and, more particularly, metal transaction cards having an internal flexible circuit connected to termination points across a discontinuity in the metal card body or to termination points across a gap in a coupling frame antenna, and to direct the pick-up currents to an antenna structure in close proximity to the module antenna of a transponder chip module for inductive coupling.

Smartcard with Coupling Frame

FIG. 1 illustrates a smartcard (SC) which may be a metal card, composite metal card or encapsulated metal card having a slit (S) to function as a coupling frame (CF). Compare FIG. 3 of U.S. Pat. No. 9,836,684 (3 ## reference numerals changed to 1 ##).

This figure illustrates the front side of a smartcard (SC) 300 which may be a metal card having a metal layer (ML), which may constitute substantially the entire thickness of the card body (CB) 102. The card body (CB) may have a module opening (MO) 108 wherein a transponder chip module (TCM) 110 may be disposed, and a slit (S) 130 extending from the module opening (MO) to the outer perimeter of the metal layer (ML) so that the metal card body (MCB) 102 may function as a coupling frame (CF) 120. The metal layer (ML) (or card body CB, or metal card body MCB) may comprise titanium, and is provided with a slit, slot or gap in the metal to create an open loop coupling frame closely adjacent to and substantially fully surrounding the transponder chip module (TCM). The slit (S) may overlap a portion of the module antenna (MA) 112 of the transponder chip module (TCM).

FIG. 2 is a diagram of an exemplary coupling frame antenna (CFA) with a track width of approximately 3 mm. The design shown illustrates a continuous closed loop single track coupling frame antenna (CFA) 202 placed within the perimeter defined by the card body (CB) 201. It is noted that the figure is illustrative of the shape and overall form of the coupling frame antenna (CFA) 202 and that the antenna may reside upon or between any of the layers that may make up a typical smartcard. The outer edges of the coupling frame antenna (CFA) 202 may extend to the periphery of the card body (CB) 201 or be offset from the edge of the smartcard by some distance to aid lamination or other assembly of the smartcard's additional layers. The path defined by the coupling frame antenna (CFA) 201 extends inwards towards and around the module opening (MO) 204. The length, width and track thickness of the coupling frame antenna (CFA) 202 in the vicinity of the module opening (MO) 204 may be set as to provide an optimum overlap with the module antenna (MA) of the transponder chip module (TCM).

The shape of the coupling frame antenna, as it extends inwardly from the left (as viewed) side of the card body to the module opening area, results in two side-by-side portions of the coupling frame antenna (CFA) being closely adjacent each other, with a gap therebetween. This gap may be comparable to the slit (S) in a conventional coupling frame (CF)

Physically Connecting a Coupling Loop Structure to a Coupling Frame

A metal card body (MCB) with a discontinuity may be represented by a one turn antenna circuit. In the case of an open loop antenna, the terminal ends of the antenna may be galvanically (physically electrically) connected to a coupling loop structure (CLS) on a flexible circuit (FC) to interface with the module antenna (MA) of a transponder chip module (TCM). The same applies to a metal card body (MCB) with termination points across a slit which can be galvanically connected to a coupling loop structure (CLS) on a flexible circuit (FC) with its antenna structure (AS) used to inductively couple with the module antenna (MA) of a transponder chip module (TCM). The discontinuity in the metal card body (MCB) may or may not extend to the module opening (MO).

FIG. 3 is a diagram of a coupling frame antenna (CFA) having a single (one) track extending almost entirely around a peripheral area of the card body (CB), and having two spaced-apart ends with termination end points (TP). The coupling frame antenna is open loop, and may have a track width of approximately 3 mm. A separation (S) or gap 303 between the two ends of the coupling frame antenna is analogous with a discontinuity (slit) in a metal layer (ML). The gap may be, for example, 1 mm.

In contrast with the coupling frame antenna (CFA) 202 shown in FIG. 2, which has a portion surrounding a module opening (MO) 304, the coupling frame antenna (CFA) 302 shown in FIG. 3 does not have a portion surrounding a module opening.

The termination end points (TPs) 304 may be connected to corresponding termination end points (TPs) on a flexible circuit (FC, FIG. 15A) disposed with a coupling loop structure (CLS) including an antenna structure (AS) located under the module antenna (MA) of a transponder chip module (TCM).

FIG. 4 is a diagrammatic view of a front surface of a smartcard (SC) which may be a metal card, composite metal card, encapsulated metal card, metal core card or a metal face card having a slit (S) or notch (N) to function as a coupling frame (CF), extending to a central area between the periphery edge of the metal card and an area for the module opening. Given that the slit (S) or notch (N) does not extend to the module opening (MO), the mechanical stability of the metal card is maintained. The termination end points (TPs) are connected to a flexible circuit (FC) (FIG. 15A) disposed with a coupling loop structure (CLS) which is closely positioned under the module antenna (MA) of the transponder chip module (TCM) for inductive coupling.

400 smartcard (SC)
402 metal layer (ML) of a card body (CB), or a metal card body (MCB)

408 module opening (MO) for receiving a transponder chip module (TCM)
430 slit (S) in the ML or MCB
420 coupling frame (CF) resulting from ML or MCB having a slit
440 termination points (TP) on the CF
410 transponder chip module (TCM)
412 module antenna (MA) in the TCM In FIGS. 3 and 4, a flexible circuit (FC) with coupling loop structure (CLS) connected to termination end points (TPs) on the coupling frame (CF) or conductive layer, direct surface eddy currents from the perimeter edge of the conductive layer to the coupling loop structure (CLS) on the flexible circuit (FC) to inductively couple with the module antenna (MA), providing power to the RFID chip (IC) in the transponder chip module (TCM).

Non-Conductive Card Bodies with RFID Slit Technology

There is a growing need to integrate electronic subassemblies into metal containing transaction cards such as a dynamic display, fingerprint sensor, LED, and for the card to operate in passive mode with a point of sale terminal by using the contactless interface to drive the electronic components and harvest energy.

The cross-sectional construction of an exemplary metal face transaction card may comprise a non-conducting anodized aluminum layer on a stainless steel supporting layer, with no electrical connection between the metal layers. The slit on the front face metal layer may be curved, meandering, having the shape of a saxophone or made up of tangents emanating from the module opening.

This disclosure also relates to the field of RFID-enabled transaction cards and, more particularly, transaction cards having at least one metal layer coated to make the surface non-conductive.

FIG. 5A illustrates an exploded view of a metal card construction with a transponder chip module (TCM) 501, front card body (FCB) 502, a slit (S) 504 extending from a perimeter edge of the card body to an area close to the module opening (MO) 503 and an adhesive film (AF) not shown. The rear card body (RCB) 508 may accommodate the magnetic stripe (MS) 510 and signature panel (SP) 511. The rear card body (RCB) may comprise a metal layer with a slit or slits. The metal layer may be oxidized (or anodized) so that its surface is rendered non-conductive.

The transponder chip module (TCM 501) may be a wire bonded module or a flip-chip module. The metal layer (ML 502) may be made of two metal layers rolled together, such as aluminum and stainless steel.

The inner face of the rear card body (RCB) 508 may feature a flexible circuit with an antenna structure to overlap the slit (S) and the module antenna (MA) of the transponder chip module (TCM) 501, to direct induced eddy currents around the module antenna (MA) and permitting inductive coupling.

FIG. 5B shows the outer face of the rear card body (RCB) 508. The RCB shown features a magnetic stripe and a signature panel with both elements integrated into the non-conductive material. Therefore, a recess may not be necessary to accommodate the elements. The rear card body (RCB) does not feature a module opening (MO).

The slit (S) 504 may describe any shape, including spiral, curved, meandering, in order to optimize the overlap of the coupling frame with the antenna structure (AS) assembled to the rear card body (RCB). The slit may be injected molded with a resin or fiber glass for reinforcement.

The rear card body (RCB) may also accommodate the placement of a security hologram, logo or other feature. Logos may be CNC milled or diamond cut.

FIG. 6 shows a diagram (perspective view) illustrating an assembly of a metal card body having a front card body (FCB) consisting of a metal layer (ML) 602 with a slit (S) 604, and acting as a coupling frame (CF). The metal layer is anodized so that its surfaces are non-conducting.

Contact pads (CP 601) for effecting a contact interface may protrude through a plurality of individual openings (e.g., one per contact pad) in the metal layer. The contact pads (CP) 601 are shown protruding through the anodized metal layer. there may be a plurality of openings for a corresponding plurality (typically six or eight) of contact pads, and each individual opening (for a given contact pad) may measure approximately 2 mm×2 mm, for example. A rear card body (RCB) 608 with an coupling loop structure (CLS) is mounted in a recess on the rear surface of the front card body. The rear card body may be a layer of an insulating material. The coupling loop structure has an antenna structure (AS1) coupling with the slit (S), and another antenna structure (AS2) coupling with a module antenna (MA) 605 of a transponder chip module (TCM, not shown), and may be formed from a flexible circuit (FC, a flexible substrate with conductive traces).

A magnetic stripe (MS) 610 and a signature panel (SP) 611 may be disposed on the rear surface of the rear card body.

FIG. 5A/B and 6 may bear some resemblance to FIGS. 4,5,6 of US 20180341846 which show, for example:

FIG. 4A illustrates an exploded view of a solid metal smartcard comprising two metal layers (ML) attached together (joined with one another) by an adhesive film (AF) 405. The front card body (FCB) 402 composed of a metal layer (ML) contains a first module opening (MO1) 403 that accepts a specially designed transponder chip module (TCM) 401. The front card body (FCB) 402 may have thickness 760 μm to 800 μm The rear card body (RCB) 408 fits into a pocket milled, etched, stamped or otherwise formed in the rear side of the front card body (FCB) 402. The front card body (FCB) 402 comprises a first slit (S1) 404 that allows the front card body (FCB) 402 to perform as a coupling frame (CF). The module antenna on the transponder chip module (TCM) 401 may have suitable overlap with the front card body (FCB) 402 to allow optimum performance of the device when operating in contactless communication with an external reader.

A difference between the FCB/RCB construction disclosed herein, versus the FCB/RCB teachings of '846 is that whereas the RCB in '846 is a metal layer (ML) with a slit (i.e., a coupling frame), the RCB disclosed herein is a non-conductive material (e.g., plastic), not metal, and supports two antenna structures (AS), in a manner similar to that of a flexible circuit (FC) with contact loop structure (CLS; see FIG. 15).

FIGS. 7A and 7B illustrate an exemplary construction for a transaction card or smartcard construction comprising two metal layers with slits (functioning as coupling frames): a non-conducting anodized aluminum (metal face) layer on a stainless steel (supporting) layer, with no electrical connection between the metal layers. (An insulating adhesive layer is disposed between the two metal layers.) The construction of the smartcard 700 may be, as follows, from front-to-rear (all dimensions approximate and exemplary):

702 scratch-resistant coating, such as UV hard coat
704 aluminum layer ("metal face"), 380 μm, anodized with a 12 to 18 μm oxidized and protected by the scratch resistant coating 702
706 module opening (MO) in the metal layer 704 for receiving a transponder chip module (TCM)
708 slit (S), or micro-slit, extending from a peripheral edge of the metal layer 704 to the module opening 706. The shape of the slit may be curved (FIG. 10A/B).
710 transponder chip module (TCM), dual interface (contact and contactless)
712 Adhesive Layer (thermosetting epoxy): 50 μm
714 Supporting Metal Layer (Stainless): 250 μm
716 module opening (MO) in the metal layer 714 for receiving the TCM
718 slit (S), or micro-slit, extending from a peripheral edge of the metal layer 704 to the module opening 716. The slit (S) may be straight.
720 Adhesive Layer (thermosetting epoxy): 50 μm
722 Plastic backing layer(s) (Laser-engravable Overlay Material) which may be the same color as the metal face 704, 50 μm, with and an inkjet-printed layer of 15 μm: 65 μm A magnetic stripe and signature panel (not shown) may be disposed on the rear (exposed) surface of the rear overlay 722,
Total thickness: 805 μm (prelaminated)
Total thickness: less than 800 μm (post lamination, depends on the shrinkage of the adhesive and synthetic layers)

The adhesive layers may be "free standing" (individual layers applied to an underlying or overlying surface), or they may be part of a "bonding layer", such as thermosetting epoxy applied on both sides of a PEN or PET carrier.

Note that, in the exploded cross-sectional views of FIG. 7B (above) and FIG. 8B (below), the edges of the layers are illustrated as rounded, whereas in reality they may be straight.

FIGS. 8A and 8B illustrate an exemplary construction for a transaction card or smartcard construction comprising three metal layers with slits (functioning as coupling frames): a stainless steel supporting layer with slit, a first non-conducting anodized aluminum layer with slit and a second non-conducting anodized aluminum layer with slit, as an alternative construction to that which was shown in FIG. 7.

The module pocket (or module opening) is configured to receive at least one of: a contactless chip module; a dual interface chip module. Internal to the card body construction an antenna structure is coupled to the slit (not shown).

U.S. Pat. No. 9,836,684 shows some card body constructions having multiple (three) metal layers with slits. See FIGS. 9, 15B, 16A therein.

The construction of the smartcard 800 may be, as follows, from front-to-rear (all dimensions approximate and exemplary):
Metal Face with micro-slit, Aluminum layer: 215 μm (Anodized with a 12 to 18 μm oxidized surface) and protected with a scratch resistant UV hard coat.
Adhesive Layer: 25 μm film (free standing thermosetting epoxy)
Supporting Metal Layer (Stainless) with Slit: 250 μm
Adhesive Layer: 25 μm film (free standing thermosetting epoxy)
Overlay material 50 μm for magnetic stripe and signature panel with inkjet-printed ink and primer 15 μm: 65 μm Total Thickness: 795 μm
Min 0.68 mm to max 0.84 mm—Min 0.027 Inch to max 0.033 Inch First, non-conducting anodized aluminum layer is joined or attached to first side of the stainless steel layer.

Second, non-conducting anodized aluminum layer is joined or attached to second side of the stainless steel supporting layer. As described above, any sort of direct or indirect connection between first non-conducting anodized aluminum layer, second non-conducting anodized aluminum layer, and the respective sides of stainless steel layer (including through intermediary layers) will suffice.

Any of the connection methods, or combination of these methods, described above (e.g., adhesive spray coating on, press-fitting in, or adhering to the stainless steel supporting layer) may be used to join or attach.

Various colors and textures may be imparted to the transaction card. Color may be introduced to transaction card by dye-sublimation, an overcoat or by adding pigments and/or dyes into the aluminum body.

Additional decorative features may be CNC machined or produced using inkjet, drop on demand printing, or laser ablation. In one embodiment, a signature panel may be produced by ablating/etching a portion of the non-conducting anodized aluminum body, thereby making that particular area of the card body receptive to ink or dye.

Alternatively, the user's signature can be digitized and then laser engraved onto the non-conducting anodized aluminum card body. By manufacturing the signature panel in this manner, cost savings are realized in the elimination of additional components and steps (e.g., a separate polymeric signature panel and the adhesive layer necessary to hold this separate component in place).

Transaction card may be characterized by the nominal dimensions of a standard sized card (e.g., 3.37"×2.125"×0.03"). One of ordinary skill in the art will understand that transaction cards of different dimensions may be made without departing from the scope of the invention disclosed herein.

The metal core (metal layers) may be any suitable metal, such as stainless steel, bronze, copper, titanium, tungsten carbide, nickel, palladium, silver, gold, platinum, aluminum, or any alloy which gives the card most of its body (structure) and weight. Additionally, or alternatively, core layer may be one or a composite of any suitable polymeric (e.g., polycarbonate, polyester, PVC, PETG, PLA, and blends thereof) and inorganic (e.g., glass, ceramic, cellulosic) material. The invention is not limited, however, to any particular material. In one embodiment, core layer includes both a layer of metal connected to a second layer of polymeric or inorganic material. In another embodiment, core layer includes a plurality of bonded metal layers.

One of ordinary skill in the art will understand that other anodized metal materials may be used without departing from the spirit or scope of the invention disclosed herein.

In one step, a pocket is provided in the layers for receiving a contactless chip module or dual interface module. For example, a slit may be defined to receive an antenna structure for use in connection with an RFID chip, which can be disposed below the aluminum or stainless steel layer.

In another step, the aluminum layer receives a surface finish. Surface finishing can include any method suitable for the particle materials of the layer such as, e.g., bead blasting, tumbling, brushing, etc.

Reinforcing and Disguising a Slit in a Metal Card Body

A laser-cut slit may be reinforced with filler such as a resin, epoxy, mold material, repair liquid or sealant applied and allowed to cure to a hardened state or flexible state. The filler may be dispensed or injection molded.

This disclosure further relates to RFID-enabled transaction cards and, more particularly, transaction cards having at least one layer of metal with a slit. Techniques to camouflage the slit with graphic elements and methods to reinforce the slit in a metal layer are presented.

FIG. 9A is a perspective view of the different layers applied to a metal surface (metal inlay) disguising the presence of a discontinuity by using primer, polymer coatings (synthetic resin) and ink, according to the invention.

FIG. 9B is a perspective view of the different layers in the stack-up construction of a metal face smartcard with the front face metal layer having a shaped slit starting at a perimeter edge of the metal card body and ending at the module opening to form a coupling frame, with the front face metal layer coated with an adhesion promoter or primer, followed by the selective application of ink to print a filigree pattern and graphic elements on the coated metal surface, disguising the presence of the shaped slit behind the printed artwork, with the printed artwork protected by a coating of varnish, and on top thereof raised characters are digitally printed before personalization, according to the invention.

FIG. 9C shows a variation in the stack-up construction of FIG. 9B, interchanging the position of the ink layer bearing the embossed alphanumeric characters, with the protective varnish layer as the final outer layer in the smartcard assembly before personalization, according to the invention.

FIG. 9D shows a further variation in the stack-up construction of FIG. 9C with the addition of a concealing ink layer hiding the presence of the underlying slit. The concealing ink layer is electromagnetic transparent and does not attenuate the field generated by the contactless POS terminal, according to the invention.

FIG. 9E is a front view of a metal face smartcard 900E with a shaped slit commencing at a top corner peripheral edge of the card body, disappearing under the printed border disguising its presence, with the slit descending downwards behind the border to a center position before crossing over to a module opening, according to the invention.

FIG. 9F is a detailed view of the shaped slit in the front face metal layer of the smartcard 900E and its disappearance under the printed border, according to the invention.

FIG. 9G is a detailed view of the non-exposed slit in the front face metal layer of the smartcard 900E after the selective deposition of a concealing ink layer to the surface of the metal, according to the invention.

FIG. 9A illustrates a front portion of a smartcard comprising: different layers applied to a metal surface (metal inlay) disguising the presence of a discontinuity (slit) in the metal layer by using primer, polymer coatings (synthetic resin), and ink. A rear portion of the card may comprise (compare plastic backing layer(s) 722, FIG. 7A).

The stackup of the card 900 may be, from bottom (rear) to top (front):

902 metal layer (ML) having a module opening (MO) and a slit (S)
   MO—module opening (MO) in the metal layer for receiving a TCM (not shown)
   S— slit (S) extending from an edge portion of the metal layer to the module opening
   The metal layer with module opening and slit functions as a coupling frame (CF)
903 clear primer layer over the metal layer
907 coating or sealant over the primer layer
908 baked-on ink layer
909 top coat layer Each of the layers 903, 907, 908, 909 may have a module opening aligned with the module opening (M) in the metal layer 902

The discontinuity (slit S) in the metal layer may be disguised or masked with baked-on ink and a plurality of coatings applied to the metal layer. An adhesion promoter or primer may be first applied to the metal layer, followed by a coating (or sealant) and an ink layer which is baked-on to the coated surface, and further protected by a top-coat layer. The coating and protective polymers may be a blend of polyurethane and polyester, or an acrylic base coating. The gloss level (low or high) depends on the quality and smoothness of the metal surface, the color of the baked-on ink, the amount and type of coatings applied and the use of any dulling agents. The primer and ink may be applied at a defined viscosity. FIG. 9A is a perspective view of the different layers applied to a metal surface (metal inlay) disguising the presence of a discontinuity by using primer, polymer coatings (synthetic resin) and ink.

The assembly of the different layers to the metal surface (metal inlay) in FIG. 9A represents the top section in the stack-up construction of a dual interface metal smartcard (SC). Not shown are the layers which form the bottom section in the stack-up construction which include an adhesive layer, printed synthetic layer and an overlay layer with magnetic stripe.

A UV hard coat layer on a release carrier layer may be further laminated to the top-coat layer (protective polymer coating). The UV hard coat layer may be laser engravable. The top-coat layer may be laser engravable. The first coating or sealant (polymer coating) on the primer may be omitted. The UV hard coat or diamond coat layer may be a clear, matte or have a mechanical brush effect.

In the embodiment of FIG. 9A, after the primer (903), ink layer (908) and top coated layer (909) are baked onto the metal inlay with an array of card body sites each with a slit, the metal inlay with baked-on-ink and a top coat for scratch protection can be further processed with digital printing of ink to the top coat layer and further protected by a layer of varnish. The additional ink layer may be further divided into two printed ink layers separated by a clear ink layer (not shown).

In the illustration of FIG. 9A, baked-on ink has been emphasized, but equally any other form of ink and its deposition, coating or printing could equally be applicable.

As a general proposition, having a single meal layer with a slit, such as described in FIG. 9A, may not be optimal, since the slit may short out when the card is flexed, particularly if the slit is a micro-slit. Hence, FIG. 9B,C,D illustrate an alternate construction for a smartcard (SC) wherein a second, underlying, supporting metal layer with a slit is provide. The two metal layers (i.e., a front face metal layer with a slit, and the underlying supporting metal layer with a slit) should be insulated from one another, by any suitable means, such as by a dielectric layer with adhesive. Moreover, the slits in the two metal layers should be located at different positions and/or orientations than one another, such as suggested in U.S. Pat. No. 9,836,684 (attention is directed to FIG. 15B, therein). This also highlights the benefit of using a flexible circuit (FC) with a coupling loop structure (CLS, and associated antennae) to allow slits to be located virtually anywhere on the metal layers while interacting with the transponder chip module (TCM), the position of which (namely the contact pads thereof) is fixed by ISO 7816.

FIG. 9B is a perspective view of the different layers in the stack-up construction of a metal face smartcard (SC) 900B with the front face metal layer having a shaped slit (S)

starting at a perimeter edge of the metal card body (MCB) and ending at the module opening to function as a coupling frame (CF), with the front face metal layer coated with an adhesion promoter or primer, followed by the selective application of ink to print a filigree pattern and graphic elements on the coated metal surface, disguising the presence of the shaped slit behind the printed artwork, with the printed artwork protected by a coating of varnish, and on top thereof raised characters (embossed) above the surface of the card are digitally printed. The front face metal layer with a shaped slit is mechanically reinforced by an underlying supporting metal layer with a slit which is offset from the slit in the front face metal layer, and the supporting metal layer is electrically separated from the front face metal layer by a dielectric layer with double-sided adhesive to bond both of the (front face, supporting) metal layers together. The shaped slit in the front face metal layer may be filled with an epoxy or resin prior to assembly with the supporting metal layer.

FIG. 9B, described briefly hereinabove, shows the construction of a smartcard (SC) 900B, having the following stackup of layers. Generally, the layers may be described starting with the front face metal layer with slit, and working both up (towards the front face of the card) and down (towards the rear face of the card) therefrom. Some details, which have already been described elsewhere, may be omitted from this description, for the sake of brevity. For descriptive purposes each layer may have a front surface and a rear surface.

902 front face metal layer (ML), with module opening (MO) and slit (S) (902, FIG. 9A)

. . . working upward from the front face metal layer 902 . . .

904 primer layer

\* note that after the prime layer is applied, a coating may be introduced to fill the slit.

908 ink layer

912 protective varnish layer

910 ink layer with raised alphanumeric characters

914 personalization/laser engraving layer

. . . working downward from the front face metal layer 902 . . .

920 dielectric layer with adhesive

922 supporting metal layer (ML), with slit (S)

924 adhesive layer

926 synthetic layer with artwork

928 laser-engravable overlay with magnetic stripe (and signature panel)

Note that the layers 920-928, behind the front face metal layer 902 may be the same as shown in FIG. 9B, and may be added below the metal layer 902 in FIG. 9A.

The stack-up construction of a metal face smartcard may be as follows:

| | |
|---|---|
| Personalization | Laser engraving of intended cardholder data |
| Raised Alphanumeric Characters | Post Lamination Varnish (PLV) - Digitally printed hard ink (0.2-1.0 mil) |
| Protective Varnish Layer | Coated or Silk Screen Printed UV Protective Varnish - Gloss, satin, matte finish (~0.5 mil) Before or after PLV |
| Ink Layer | Digitally Printed UV Ink - Fine ornamental background, border, and overprint of graphic features and texture |
| Adhesion Promoter/Primer Layer | Underlying Adhesion Promoter or Primer - Absorbed onto the surface of the front face metal layer (UV ink and bonding agent: 0.6-0.8 mils) |
| Front Face Metal Layer with Shaped Slit | 12 mils Stainless Steel with a Shaped Slit - Epoxy or resin filled slit for visual effect and or mechanical reinforcement Surface of the stainless-steel layer may be grain structured, pickled or electropolished |
| Dielectric Layer | Double-sided Thermosetting Epoxy on a PEN Carrier - Insulating layer between the front face metal layer and the supporting metal layer (3 mils) |
| Supporting Metal Layer with Slit | 6 mils Stainless Steel with an Offset Slit - Structural reinforcement of front face metal layer with shaped slit |
| Adhesive Layer | Free Standing Thermosetting Epoxy (1 mil) |
| Synthetic Layer with Artwork | 5 mils Printed PVC Laminate - Combination of lithographically offset printed PMS (Pantone Matching System) colors and silk screen printed solvent inks |
| Outermost Layer | 2.5 mils Laser Engravable Overlay with Magnetic Stripe |

Total Thickness of Card Body Pre-Lamination: ~31.3 mils or 795 μm ISO 7810 Card thickness tolerance: 0.84 mm (max) and 0.68 (min)

The slit may be filled with a UV curing epoxy or a two-component adhesive, dispensed as a microfluidic droplet for in situ bonding of the slit under pressure/vacuum control.

Instead of filling the slit with an epoxy or resin in the front face metal layer (12 mils stainless steel layer), a primer may be first applied to the stainless steel layer followed by a digitally printed UV curing ink selectively deposited around the area of the slit to camouflage its presence, further discussed in detail below.

Instead of printing the background and graphic elements, the features may be directly lasered into the metal. The metal may also be coated with a baked-on ink layer.

The coated or silk screen printed UV protective varnish layer may be replaced by a UV hard coat layer.

The printing techniques of drop on demand (digital deposition), lithographic offset and silk screen printing as described above are interchangeable.

The post lamination varnish (PLV) may include the printing of graphic features and borders.

The shaped slit in the front face metal layer may be filled with an epoxy or resin, may be sealed with an adhesion promoter or primer, and camouflaged with ink or artwork The surface of the metal inlay may be pretreated with a catalyzed screen ink and when cured forms a hard heat and chemical resistant film which can be produced in a gloss or matt finish depending on the hardener or additives used. The hardener determines the viscosity of the ink and may fill and cover the slit after application.

FIG. 9C shows a variation in the stack-up construction of FIG. 9B, interchanging the position of the ink layer bearing the embossed alphanumeric characters, with the protective varnish layer as the final outer layer in the smartcard assembly before personalization.

FIG. 9C, described briefly hereinabove, shows the construction of a smartcard (SC) 900C, having the following stackup of layers. Generally, the layers may be described starting with the front face metal layer with slit, and working both up (towards the front face of the card) and down (towards the rear face of the card) therefrom. Some details, which have already been described elsewhere, may be omitted from this description, for the sake of brevity. For descriptive purposes each layer may have a front surface and a rear surface.

902 front face metal layer (ML), with module opening (MO) and slit (S) (902, FIG. 9A)
   . . . working upward from the front face metal layer 902 . . .
904 primer layer
   * note that after the prime layer is applied, a coating may be introduced to fill the slit.
908 ink layer
910 ink layer with raised alphanumeric characters (absent from the construction of FIG. 9B)
   * note that the ink layer 910 may be optional
912 protective varnish layer
   * note that the layers 910 and 912 are reversed from what was shown in FIG. 9B
914 personalization/laser engraving layer
   . . . working downward from the front face metal layer 902 . . .
920 dielectric layer with adhesive
922 supporting metal layer (ML), with slit (S)
924 adhesive layer
926 synthetic layer with artwork
928 laser-engravable overlay with magnetic stripe (and signature panel)

Note that the layers 920-928, behind the front face metal layer 902 may be the same as shown in FIG. 9B, and may be added below the metal layer 902 in FIG. 9A.

In the embodiments of FIGS. 9B and 9C, the first ink layer (908) disposed on the primer layer (904) may be divided into two printed ink layers, one carrying graphical artwork while the other carrying other features and information, separated by a clear ink layer (not shown).

Techniques to Camouflage a Discontinuity in a Metal Layer

As discussed above and in the prior art, a discontinuity in a metal layer may be camouflaged with (i) an epoxy or resin filling the slit; (ii) a primer and a coating layer applied to a micro-slit (~50 µm) and overprinted with CMYK ink, and or (iii) applying a metal foil laminate to a metal layer or metal inlay with an array of card body sites.

Equally, a discontinuity in a metal layer can be optically disguised or concealed by a metallic ink layer, a pearl ink layer, a metallic brush effect, or mechanical brush effect in the design of the ink. This may be considered as a concealing ink layer.

Some techniques for disguising or camouflaging a slit may be "borrowed" from U.S. Pat. No. 5,413,814 (1995-05-09; Bowen et al.) which discloses techniques for coating articles to have the appearance of wood, leather or other naturally occurring materials.

Metallic Ink and Non-Conductivity

Metallic ink is a varnish or vehicle containing metallic particles. Common metals used to manufacture metallic ink include copper, aluminum, bronze or zinc. When metallic ink is printed and left to dry, the metallic particles rise to the surface, reflecting light and creating a metallic sheen. Metallic inks create a similar, but less intense, effect than foil stamping because they are applied as paste or liquid ink, versus a thin sheet of metal foil applied directly on top of a substrate.

It is important to note that metallic inks are opaque, whereas conventional process inks (cyan, magenta, yellow and black) are transparent.

The metallic ink may be deposited on a metal surface or a pretreated/coated metal surface and selectively made conductive by exposure to light radiation (photo-sintering).

Reference is made to U.S. Pat. No. 10,231,344 which discloses a metallic ink forming a conductive film comprising depositing a non-conductive film on a surface of a substrate, wherein the film contains a plurality of copper nanoparticles and exposing at least a portion of the film to light to make the exposed portion conductive. Exposing of the film to light photosinters or fuses the copper nanoparticles.

Electrical resistance value of normal metallic inks is about $10^{4-5}\Omega$, while the electrical resistance of non-conductive metallic ink is over $10^9\Omega$.

Generally, metallic ink may be applied to a metal surface with a slit, covering the metal surface including filling the slit. The ink is cured with intense light radiation which causes nanoparticles in the ink to become conductive, but at those areas (e.g., in the slit) where the intense light radiation is not applied, the ink cures in an atmospheric environment, and the area (e.g., the slit) remains non-conductive because the nanoparticles have not bonded.

Light-curable, metallic ink containing nanoparticles may also be blanked deposited on a metal surface, then selectively exposed to high intensity light to form conductive patterns, such as lines or traces, in a manner similar to forming patterns in photoresist for semiconductor or printed circuit board fabrication. This technique can be used to form some of the antenna structures described herein.

Pearl Ink

Pearlescent inks producing a shimmering pearl effect may be used as a replacement for a metallic ink.

Reference is made to U.S. Pat. No. 6,749,123 which discloses the printing of pearl ink in producing a transaction card. The exemplary ink gradient for each card is printed using known printing inks suitably configured for printing on plastic, such as Pantone colors. In an exemplary embodiment of U.S. Pat. No. 6,749,123, the ink used for the stippling is a silver pearl ink and is applied to the outside surface of each plastic sheet. Ink gradient is printed on the surface of each of the sheets using a silk screen printing process which provides an opaque, heavier ink coverage or using offset printing process which provides halftone images in finer detail. The words "American Express" are printed in Pantone 8482 using a similar silkscreen process.

Pearl Ink Printing

Pearlescent pigments are often employed in printing inks to create impressionable and appealing smartcards, since they provide both natural pearl shine and the effect of goniochromism. With respect to their interaction with light, the pigments used in printing inks can be divided into absorption and effect pigments. The latter have become increasingly important in graphic arts industry because of their ability to create the range of optical effects—the effect of metals, shine, change of perceived color with the change of viewing angle or the angle of illumination (effect knows as goniochromism) etc. Pearlescent pigments belong to the special effect pigments due to their goniochromatic properties, as well as the possibility to produce the effect of pearl luster.

Mechanical Brush Effect

Digitally printing a fake mechanical brush effect on metal optically distorts the visibility of an underlying micro slit. The metallic grain effect can be achieved in the graphic design settings such as the gradient direction for metallic texture, distribution, noise, motion blurriness, foreground color and brush opacity.

A plethora of other inks used in the smartcard industry could be used to hide a discontinuity in a metal layer as well as the application of the ink can play a crucial role.

FIG. 9D shows a further variation in the stack-up construction of FIG. 9C with the addition of a concealing ink layer hiding the presence of the underlying slit. The concealing ink layer is electromagnetic transparent and does not attenuate the field generated by the contactless POS terminal. The concealing ink may be a metallic ink (non-conductive around the area of the slit), a pearl ink having poor electrical conductivity, or the concealing ink layer may be achieved by a mechanical brush effect accomplished by artwork design using drop on demand printing.

FIG. 9D, described briefly hereinabove, shows the construction of a smartcard (SC) 900D, having the following stackup of layers. Generally, the layers may be described starting with the front face metal layer with slit, and working both up (towards the front face of the card) and down (towards the rear face of the card) therefrom. Some details, which have already been described elsewhere, may be omitted from this description, for the sake of brevity. For descriptive purposes each layer may have a front surface and a rear surface.

902 front face metal layer (ML), with module opening (MO) and slit (S) (902, FIG. 9A)
 . . . working upward from the front face metal layer 902 . . .
904 primer layer
 * note that after the prime layer is applied, a coating may be introduced to fill the slit.
906 concealing ink layer (absent from the construction of FIG. 9C)
908 ink layer
 *note that the layers 906 and 908 could be positionally interchanged
910 ink layer with raised alphanumeric characters (absent from the construction of FIG. 9B)
 * note that the ink layer 910 may be optional
912 protective varnish layer
914 personalization/laser engraving layer
 . . . working downward from the front face metal layer 902 . . .
920 dielectric layer with adhesive
922 supporting metal layer (ML), with slit (S)
924 adhesive layer
926 synthetic layer with artwork
928 laser-engravable overlay with magnetic stripe (and signature panel)

Note that the layers 920-928, behind the front face metal layer 902 may be the same as shown in FIGS. 9B and 9C, and may be added below the metal layer 902 in FIG. 9A.

In the embodiment of FIG. 9D, the concealing ink layer (906) and the first ink layer (908) disposed on the primer layer (904) may also be separated by a clear ink layer (not shown).

FIG. 9E is a front view of a metal face smartcard 900E with a shaped slit commencing at a top corner peripheral edge of the card body, disappearing under the printed border disguising its presence, with the slit descending downwards behind the border to a center position before crossing over to a module opening (MO). The laser cut slit may be 50 μm wide and may be only visible from a certain angle. The slit may be filled with a clear adhesion promoter or primer before ink printing, to further disguise its presence.

The decorative features may be post lamination varnish accomplished through digital printing of flexible and hard inks.

FIG. 9F is a detailed view of the shaped slit in the front face metal layer of the smartcard 900E, its disappearance under the printed border, and its exposure or visibility at the edge of the card body and at the area around the module opening (MO).

FIG. 9G is a detailed view of the non-exposed slit in the front face metal layer of the smartcard 900E after the deposition of a concealing ink layer to the surface of the metal In summary, the strategy to camouflage or disguise a discontinuity in a front face metal inlay with an array of card bodies, in producing metal face smartcards is to: (i) fill the slit with an epoxy or resin at each card body site in the metal inlay for electrical isolation; (ii) reinforce the mechanical robustness by adhesively attaching a supporting metal inlay with offset positioned slits to the front face metal inlay; (iii) prime the metal inlay surface with an adhesion promoter or primer; (iv) hide the existence of the underlying slits with a concealing ink layer comprising of CMYK ink, metallic ink, pearl ink or with a fake design such as a mechanical brush effect. To retain the drop acoustics of a metal sound, thermosetting epoxy adhesive is used to join the metal layers, and to attach a metal layer to a synthetic layer. In short, fill for electrical isolation, support for mechanical reinforcement, prime for ink adhesion, conceal with ink and design effects for camouflage and protect with a coating for surface enhancement and longevity.

FIG. 9A is illustrative of the following process steps (method): laser cut slits and openings in a front face metal layer for an antenna circuit at each card body site in an array forming a metal inlay; prime the surface of the front face metal inlay for coating adhesion; fill or seal the slits with a coating for electrical insulation while covering the entire area of the metal inlay; print ink on the coated front face metal inlay for color and graphics while simultaneously concealing the slits with design effects for camouflage; protect the printed artwork with a top coating for surface enhancement and longevity; optionally support the front face metal inlay with a second metal inlay having offset positioned slits using thermosetting epoxy on both sides of a dielectric for mechanical reinforcement; followed by lamination of the synthetic layers, mechanical engraving of logos to the front face metal inlay, and metal card body singulation; before personalizing with laser engraving of card holder data.

The ink and coating may be applied and baked on before the second metal inlay is attached or after it is attached. The top coating can be further protected with a UV hard coat or diamond coat. The top coating may be replaced by the UV hard coat. The UV hard coat may be clear, matte, or have a mechanical brush effect.

FIGS. 9B and 9C are illustrative of the following process steps (method): laser cut slits and openings in a front face metal layer for an antenna circuit at each card body site in an array forming a metal inlay; fill or seal the slits with an epoxy, resin or coating for electrical insulation; support the front face metal inlay with a second metal inlay having offset positioned slits using thermosetting epoxy on both sides of a dielectric layer for mechanical reinforcement; prime the surface of the front face metal inlay for ink adhesion; print ink on the front face metal inlay for color and graphics as well as to disguise the presence of the slits; protect the printed artwork with a top coating for surface enhancement and longevity; followed by lamination of the synthetic layers and metal card body singulation; before personalizing with data of the intended card holder by means of laser engraving and or printing.

FIG. 9D is illustrative of the following process steps (method): laser cut slits and openings in a front face metal layer for an antenna circuit at each card body site in an array forming a metal inlay; fill or seal the slits with an epoxy, resin or coating for electrical insulation; support the front face metal inlay with a second metal inlay having offset positioned slits using thermosetting epoxy on both sides of a dielectric layer for mechanical reinforcement; prime the surface of the front face metal inlay for ink or coating adhesion; conceal the slits with ink and design effects for camouflage; print ink on the front face metal inlay for color and graphics; protect the printed artwork with a top coating for surface enhancement and longevity; followed by lamination of the synthetic layers and metal card body singulation; before personalizing with data of the intended card holder by means of laser engraving and or printing.

Embossed characters or graphics may be applied before or after the application of the protective varnish layer by the process of post lamination varnish. The concealing ink layer may comprise of CMYK ink, metallic ink, pearl ink or with a fake design effect such as a mechanical brush. A non-attenuating metal foil layer may be applied to the front face metal inlay surface to cover the slits. A UV hard coat layer may be laminated to the protective varnish layer or may replace the protective varnish layer.

Filling or Sealing a Slit in a Metal Inlay for Electrical Isolation Versus Increasing the Width of the Slit to Avoid Electrical Shorting There is a trade-off between using a narrow slit or micro-slit (~50 μm) to hide the presence of a discontinuity in a metal card body, and widening the width of the slit to avoid electrical shorting when the metal card is flexed or bent during insertion in a POS terminal, resulting in the edges of the slit converging and touching. To avoid shorting, a narrow slit in a metal inlay can be filled with an epoxy or resin, a slit in a metal inlay can be primed and sealed with a non-conductive medium using a digital printing press to dispense a polymer coating, or a slit in a metal inlay can be filled with an adhesive epoxy as a result of the lamination of the card assembly under pressure, temperature and dwell time, with the epoxy flowing into, filling and curing within the slit.

The alternative is to diverge away from the narrow slit and widen the slit, but with the downside that its presence becomes more noticeable, and the subsequent camouflaging mechanisms to disguise the wider slit are more elaborate.

"Decorative" Slits

FIG. 10A/B and 11A/B/C show some examples of smartcards having metal card bodies (MCB) with slits (S) enabling the metal card bodies to function as coupling frames (CF), wherein the slits are shaped to suggest (to a user) readily recognizable objects, or logos, or the like, such as a saxophone (FIG. 10A/B) or the VISA™ logo (FIG. 11A/B/C).

FIG. 10A is a sketch of the outline (profile) of a non-linear, curvy, readily-recognizable object such as a saxophone (neck, body, u-shaped bow and flared bell). A continuous slit (S, shown as a dark line) may be disposed along a portion of the outline of the saxophone, such as from the mouthpiece to the bell. The slit (S) will be the slit in a metal layer or metal card body, enabling the metal layer or metal card body to function as a coupling frame. Remaining portions of the outline, making the saxophone more recognizable, may be engravings (or markings) which have only an aesthetic purpose, and no "functional" purpose.

Generally, the portion of the object (FIG. 10) or logo (FIG. 11) forming the slit (S) may be an incomplete outline of the object or logo (FIG. 11), and some remaining portions of the object or logo may be printed, or engravings, etc.

FIG. 10B shows a smartcard (SC) with the saxophone "image" of FIG. 10A with the slit (S) extending continuously from a peripheral edge of the card body (CB) to a module opening (MO) in the card body. The slit may be mechanically engraved and or laser etched in a metal card body (MCB), with the slit (S) passing entirely through a metal layer or metal card body.

FIG. 11A shows an icon representing the logo of the payment scheme VISA in which a continuous slit passes from the peak of the V to the bottom of the A.

FIG. 11B shows an icon representing the logo of the payment scheme VISA in which a continuous slit (S) passes from the peak of the V to the top of the I and S and descending to the bottom of the A.

FIG. 11C shows a smartcard (SC) with an icon representing the logo of the payment scheme VISA with a continuous slit (S) mechanically engraved and or laser etched in a metal card body with the slit passing entirely through a metal layer (ML) or metal card body (MCB).

The patterns suggested above are just examples of a myriad of possible patterns to represent a logo, person, animal, signature, character, digital data, geographic area, and many other forms of patterns.

Metal Inlays

The different techniques to improve the rigidity of a metal card body after a slit has been machined in the metal, will affect the acoustics of the metal card when tossed on a hard surface.

This disclosure also relates to metal transaction cards, in particular the manufacturing process of producing metal inlays which form an integral part of a metal transaction card with contact and contactless functionality. The metal inlays may be laser cut from an endless web of metal, with laser cut steps replacing timing consuming card milling steps.

FIG. 12 illustrates a perforated metal inlay (MI) site with a metal frame (MF) formed by laser cutting, water cutting or chemical etching, featuring a front and rear metal layer with a slit (S) and module opening (MO) to act as a coupling frame (CF), and the coupling frame (CF) supported by struts (SRTs) connected to said metal frame (MF), with the metal frame (MF) having alignment holes (ah) for later precision punching or cutting, in facilitating the singulation of a metal card body (MCB) from a laminated metal inlay (MI) with front and rear plastic layers.

The coupling frame (CF) is separated from the metal frame (MF) by a laser cut air gap (ag). Not shown is a dielectric layer with an adhesive coating on each side which is positioned between the front and rear metal layers, prior to the front and rear metal layers being folded over on each other to form a metal core in a plastic-metal-plastic smartcard. The shape and size of a transponder chip module (TCM) fits precisely the laser cut opening (MO) in the front and rear metal layers. The openings may be stuffed (filled) with a plastic slug prior to lamination with upper and lower plastic layers.

FIG. 13 illustrates a metal inlay (MI) in which the front and rear metal layers, consisting of a metal frame (MF) supporting a coupling frame (CF), are folded over on each other at the point of perforations (perfs). The coupling frame (CF) is supported in the metal frame (MF) by struts (SRTs), resulting in an air gap (ag). Alignment holes (ah) are used to precisely position the front and rear metal layers during the folding process. A slit (S) is disposed in the front and rear metal layers forming the coupling frame (CF). Not shown is a dielectric layer placed between the folded metal layers. The resulting metals layers are laminated together and in the same or in a second lamination step, front and rear plastic layers are laminated to the metal inlay (MI) so as to achieve an overall thickness of approximately 600 μm. In a final step, the metal inlay shrouded in plastic is treated with a primer in preparation for digital printing, and the addition of overlay layers to reach ISO thickness conformity.

FIG. 14 illustrates a metal inlay (MI) disposed with a metal frame (MF) supporting a coupling frame (CF) which is suspended from the metal frame (MF) using supporting struts. The coupling frame (CF) has a slit which extends from the perimeter edge of the metal card body (MCB), but does not extend to the module opening (MO). Alignment holes (ah) in the metal inlay (MI) may be later used for registration in precise cutting or punching of the individual metal card body (MCB) sites.

More generally, a method is disclosed for forming (making) a metal inlay (MI) for a smartcard (SC) having two metal layers (ML1, ML2), each metal layer having a module opening (MO) and a slit (S) extending from a peripheral edge of the given metal layer to the module opening in the metal layer so that the metal layer may function as a coupling frame (CF). The method generally involves:
  starting with (providing) a single metal substrate,
  forming the two metal layer coupling frames essentially side-by-side in the substrate,
  then folding the substrate over so that the two metal layer coupling frames are stacked (disposed) one atop the other, while providing a layer of insulating material between the two coupling frames.

The metal inlay may be laminated with upper and lower plastic and adhesive layers to produce a pre-laminated inlay which completely shrouds the metal with plastic. During corona treatment, no metal is exposed. The card body sites are cut or punched from the pre-laminated inlay, without the need to CNC mill the card body sites from the pre-laminated inlay. The card body edges may be beveled or chamfered using a simple grinding tool.

MCB Metal card body
MI Metal Inlay
MF Metal frame
CF Coupling frame
MO Module opening
S Slit
TCM Transponder chip module
ah Alignment holes
ag Air gap
perfs Perforations
struts Support struts Dual interface embedded metal smartcards (plastic front—metal core—plastic back) may be produced from a metal inlay laminated with plastic layers having an array of metal card body sites, without having to CNC mill the individual card bodies from the array. The metal card bodies are extracted from the metal laminate by a technique of cutting or punching using alignment holes or metal inlay corners for registration. The metal inlay comprises a metal frame having struts to support a coupling frame in the form of a card body. The struts simply hold the coupling frame(s)/card body in place, with an air gap existing between the metal frame and the coupling frame. The metal inlay may comprise a single metal layer or two metal layers laminated together separated by a dielectric layer. The two metal layers may be prepared on a single metal sheet having perforations to allow for bending of the single metal sheet so that the metal layers are folded over on each other. The metal inlay (MI), comprising a metal frame (MF), supporting struts, coupling frame (CF) with slit (S) and module opening (MO), perforations, alignment holes and air gap, may be formed by means of laser cutting, water cutting or chemical etching.

The metal inlays can be manufactured from metal sheets or the metal inlays can be manufactured from a reel of metal and processed step by step in a continuous production line.

FIG. 15A is a diagram (cross-sectional view) of a smartcard (SC) having a card body (CB), a module opening (MO) for receiving a transponder chip module (TCM) with a module antenna (MA), and a slit (S), and further having a flexible circuit (FC) with a contact loop structure (CLS) and an antenna structure (AS), according to the invention. The flexible circuit (FC) is connected to termination points (TP) on the coupling frame, near the slit (S).

FIG. 15B is a diagram (mostly cross-sectional view) of a smartcard (SC) having a card body (CB), a module opening (MO) for receiving a transponder chip module (TCM) with a module antenna (MA), and a slit (S), and further having a flexible circuit (FC) with a contact loop structure (CLS) and an antenna structure (AS), according to the invention. The flexible circuit (FC) has a patch antenna (PA) for coupling with the slit (S).

FIGS. 15A and 15B show two versions of a smartcard (SC) having a card body (CB), a module opening (MO) for receiving a transponder chip module (TCM) with a module antenna (MA). The card body may be a metal card body (MCB).

A slit (S) is shown extending from a peripheral edge of the card body (CB), towards an interior area of the card body (CB), but does not extend to the module opening (MO). The slit is shown "sideways" in the diagram. Alternatively, the slit (S) may extend to the module opening (MO).

The module opening (MO) may be a stepped recess (R) having a wider (P1) portion for receiving an upper, wider portion of the transponder chip module (TCM), and a narrower (P2) portion for receiving a lower, narrower portion of the transponder chip module (TCM). The transponder chip module (TCM) is RFID-enabled, and capable of contactless communication. The transponder chip module (TCM) may also have contact pads (CP) disposed on its front surface for effecting a contact interface, resulting in a dual-interface (contact and contactless) capability.

The flexible circuit (FC) has a contact loop structure (CLS) with an antenna structure (AS) disposed near the transponder chip module (TCM), for coupling with the module antenna (MA) in the transponder chip module (TCM).

In FIG. 15A, the slit (S) is shown having termination points (TP) near the slit (S), and the flexible circuit (FC) is connected to the termination points. In this manner, currents at the slit can be harvested by the flexible circuit (FC) and transported to the module antenna (MA), via the antenna structure (AS).

In FIG. 15B, a patch antenna (PA) is shown, disposed near or overlying the slit. In this manner, currents at the slit can be harvested by the flexible circuit (FC) and transported to the module antenna (MA), via the antenna structure (AS), or a Sense Coil (SeC), or the like.

By using the flexible circuit (FC) with antennas (AS, PA), eddy currents can be captured from a slit and said currents can be "transported" to another location on the card, such as to a transponder chip module (TCM). This is beneficial since it eliminates the need for the slit (S) to overlap the module antenna (MA) in the transponder chip module (TCM). Such overlap (including "closely adjacent") is prevalent in the prior art (e.g., U.S. Pat. Nos. 9,475,086 and 9,798,968). The position of the transponder chip module (TCM) is dictated by ISO 7816. By using the flexible circuit (FC) with coupling loop structure (CLS), the slit can be relocated anywhere, and energy (currents) from multiple slits disposed at multiple locations around the card body can readily be harvested and utilized by the transponder chip module (TCM) and/or any other modules present in the card. This concept is also applicable to metal edges (ME) which produce eddy currents.

CNC Milling

Typically, cards may be manufactured (laid up and laminated) in sheet form, each sheet having a plurality of cards, such as in a 5×5 array, and CNC (computer numerical control) machining may be used to singulate (separate) the finished cards from the sheet. Resulting burrs, particularly in the metal layers, may cause defects, such as electrical shorting of the slit. Hence, CNC machining of metal core, metal face or solid metal smartcards may be performed using cryogenic milling, such as in an environment of frozen carbon dioxide or liquid nitrogen.

Some Additional Comments

Some of the card embodiments disclosed herein may have two metal layers, separated by a dielectric coating or an insulating layer, rather than a single metal layer. The two metal layers may comprise different materials and may have different thicknesses than one another. For example, one of the metal layer may be stainless steel while the other metal layer may be titanium. In this manner, the "drop acoustics" of the metal card body may be improved, in that the card, when dropped or tapped (edgewise) on a hard surface, sounds like a solid metal card (making a ringing or tinkling sound), rather than like a plastic card (making a "thud").

Generally, in order for the smartcard to be "RFID-enabled" (able to interact "contactlessly"), each of the one or more metal layers should have a slit, or micro-slit. When there are two (or more) metal layers with slits in the stack-up, the slits in the metal layers should be offset from one another.

Some Generic Characteristics

The smartcards described herein may have the following generic characteristics:

The card body may have dimensions similar to those of a credit card. ID-1 of the ISO/JEC 7810 standard defines cards as generally rectangular, measuring nominally 85.60 by 53.98 millimeters (3.37 in×2.13 in).

A chip module (RFID, contact type, or dual interface) may be implanted in a recess (cavity, opening) in the card body. The recess may be a stepped recess having a first (upper, P1 portion) having a cavity depth of 250 μm, and a second (lower, P2 portion) having a cavity depth of (maximum) 600 μm.

A contact-only or dual interface chip module will have contact pads exposed at a front surface of the card body.

ISO 7816 specifies minimum and maximum thickness dimensions of a card body: Min 0.68 mm (680 μm) to Max 0.84 mm (840 μm) or Min 0.027 inch to Max 0.033 inch Generally, any dimensions set forth herein are approximate, and materials set forth herein are intended to be exemplary. Conventional abbreviations such as "cm" for centimeter", "mm" for millimeter, "μm" for micron, and "nm" for nanometer may be used.

The concept of modifying a metal element of an RFID-enabled device such as a smartcard to have a slit (S) to function as a coupling frame (CF) may be applied to other products which may have an antenna module (AM) or transponder chip module (TCM) integrated therewith, such as watches, wearable devices, and the like.

Some of the features of some of the embodiments of RFID-enabled smartcards may be applicable to other RFID-enabled devices, such as smartcards having a different form factor (e.g., size), ID-000 ("mini-SIM" format of subscriber identity modules), keyfobs, payment objects, and non-secure NFC/RFID devices in any form factor The RFID-enabled cards (and other devices) disclosed herein may be passive devices, not having a battery and harvesting power from an external contactless reader (ISO 14443). However, some of the teachings presented herein may find applicability with cards having self-contained power sources, such as small batteries (lithium-ion batteries with high areal capacity electrodes) or supercapacitors.

The transponder chip modules (TCM) disclosed herein may be contactless only, or dual-interface (contact and contactless) modules.

In their various embodiments, the invention(s) described herein may relate to payment smartcards (metal, plastic or a combination thereof), electronic credentials, identity cards, loyalty cards, access control cards, and the like.

While the invention(s) may have been described with respect to a limited number of embodiments, these should not be construed as limitations on the scope of the invention(s), but rather as examples of some of the embodiments of the invention(s). Those skilled in the art may envision other possible variations, modifications, and implementations that are also within the scope of the invention(s), and claims, based on the disclosure(s) set forth herein.

What is claimed is:

1. A smartcard (SC) comprising:
 a transponder chip module (TCM) having a module antenna (MA) for enabling contactless capability and contact pads (CP) for effecting a contact interface;
 a card body (CB) having a module opening (MO) for receiving the transponder chip module (TCM) and a slit (S) extending from a peripheral edge of the card body towards an interior area of the card body; and
 a flexible circuit (FC) having a coupling loop structure (CLS) with an antenna structure (AS) disposed near the transponder chip module for coupling with the module antenna;
 wherein:
 the smartcard (SC) comprises a front card body (FCB);
 a smaller rear card body (RCB) fits into a recess in a rear surface of the front card body (FCB); and wherein:
the coupling loop structure (CLS) is disposed on the rear card body (RCB).

2. The smartcard of claim 1, wherein:
the rear card body comprises a layer of an insulating material.

3. The smartcard of claim 1, wherein:
the coupling loop structure (CLS) comprises two antenna structures (AS1, AS2).

4. The smartcard of claim 2, wherein:
the two antenna structures (AS) couple with the slit (S) and the module antenna (MA).

5. The smartcard of claim 1, wherein:
the coupling loop structure (CLS) is disposed on a flexible circuit (FC) which is a flexible substrate with conductive traces.

6. The smartcard of claim 1, wherein:
the antenna structure is wire wound, chemically etched or laser etched.

7. The smartcard (SC) of claim 1, wherein:
the card body is a metal card body (MCB).

8. The smartcard (SC) of claim 1, wherein:
the flexible circuit (FC) is connected to termination points (TP) near the slit.

9. The smartcard (SC) of claim 1, further comprising:
a patch antenna (PA) disposed near or overlying the slit.

10. The smartcard (SC) of claim 1, wherein:
the smartcard is a metal card, composite metal card, or encapsulated metal card.

11. The smartcard (SC) of claim 1, wherein:
the transponder chip module has 6 or 8 contact pads.

12. The smartcard (SC) of claim 1, wherein:
the front card body (FCB) comprises an anodized metal layer (ML) with the slit (S); and
the contact pads (CP) protrude through a plurality of individual openings in the anodized metal layer.

* * * * *